United States Patent
Bogaki et al.

(10) Patent No.: US 10,677,646 B2
(45) Date of Patent: Jun. 9, 2020

(54) LIGHT RECEIVING SENSOR, SENSOR MODULE, AND PAPER SHEET HANDLING APPARATUS

(71) Applicant: GLORY LTD., Himeji-shi, Hyogo (JP)

(72) Inventors: Akira Bogaki, Hyogo (JP); Takahiro Yanagiuchi, Hyogo (JP); Takaaki Morimoto, Hyogo (JP); Satoru Oshima, Hyogo (JP)

(73) Assignee: GLORY LTD., Himeji-shi, Hyogo (JP)

( * ) Notice: Subject to any disclaimer, the term of this patent is extended or adjusted under 35 U.S.C. 154(b) by 0 days.

(21) Appl. No.: 15/508,527

(22) PCT Filed: Aug. 31, 2015

(86) PCT No.: PCT/JP2015/074740
§ 371 (c)(1),
(2) Date: Mar. 3, 2017

(87) PCT Pub. No.: WO2016/035760
PCT Pub. Date: Mar. 10, 2016

(65) Prior Publication Data
US 2017/0276543 A1 Sep. 28, 2017

(30) Foreign Application Priority Data

Sep. 3, 2014 (JP) .................. 2014-178791

(51) Int. Cl.
*G01J 1/04* (2006.01)
*G06T 1/00* (2006.01)
(Continued)

(52) U.S. Cl.
CPC .............. *G01J 1/0437* (2013.01); *G01J 1/04* (2013.01); *G01J 1/047* (2013.01); *G06T 1/00* (2013.01);
(Continued)

(58) Field of Classification Search
CPC .......... G07D 7/12; G07D 11/50; G07D 11/16; G07D 2211/00; G07D 11/13; G07D 11/30;
(Continued)

(56) References Cited

U.S. PATENT DOCUMENTS 5,367,577 A * 11/1994 Gotaas ..................... G07D 7/12
382/135
6,803,955 B1 * 10/2004 Yosida ................... H04N 5/235
348/272

(Continued)

FOREIGN PATENT DOCUMENTS

JP 6-204444 A 7/1994
JP 2003-46726 A 2/2003
(Continued)

OTHER PUBLICATIONS

European Search Report (Application No. 15837733.3—PCT/JP2015/074740) (6 pages—dated Mar. 18, 2016).

*Primary Examiner* — Chiawei Chen
(74) *Attorney, Agent, or Firm* — Renner, Kenner, Greive, Bobak, Taylor & Weber

(57) ABSTRACT

By overlapping lighting timings of light sources that emit lights of a plurality of different wavelength bands including a wavelength band of at least a visible light region and an infrared light region, the lights of the plurality of the different wavelength bands including the wavelength band of at least the visible light region and the infrared light region are emitted on a banknote while securing an overlap in timings thereof. Moreover, by using light receiving elements each including a bandpass filter that allows only light of a wavelength range that corresponds to the wavelength band of each of the light sources, received light intensities of the light of the wavelength range that corresponds to the wavelength band of each of the light sources are acquired (Continued)

simultaneously, and image data are formed based on the received light intensity of every acquired wavelength band.

23 Claims, 15 Drawing Sheets

(51) Int. Cl.
| | |
|---|---|
| *G07D 7/12* | (2016.01) |
| *H04N 1/028* | (2006.01) |
| *H04N 1/04* | (2006.01) |
| *H04N 1/48* | (2006.01) |
| *H04N 1/203* | (2006.01) |
| *G07D 7/1205* | (2016.01) |
| *G07D 7/121* | (2016.01) |

(52) U.S. Cl.
CPC ............... *G07D 7/12* (2013.01); *G07D 7/121* (2013.01); *G07D 7/1205* (2017.05); *H04N 1/028* (2013.01); *H04N 1/02895* (2013.01); *H04N 1/04* (2013.01); *H04N 1/2034* (2013.01); *H04N 1/486* (2013.01); *H04N 1/488* (2013.01); *H04N 2201/02493* (2013.01)

(58) Field of Classification Search
CPC .... G07D 11/22; G07D 2207/00; G07D 11/40; G07D 11/23; G07D 7/06; G07D 7/121; G07D 7/205; G07D 7/1205; H04N 1/028; H04N 1/04; H04N 2209/045; H04N 5/3537; H04N 9/045; H04N 2209/047; H04N 5/332; H04N 5/33; H01L 27/14621; B65H 2701/1912; G07F 7/04; G01J 3/02; G01J 3/42
See application file for complete search history.

(56) References Cited

U.S. PATENT DOCUMENTS

| | | | | |
|---|---|---|---|---|
| 6,806,981 | B1* | 10/2004 | Konno | H04N 1/02815 |
| | | | | 358/302 |
| 7,359,543 | B2* | 4/2008 | Tsuji | G07D 7/121 |
| | | | | 194/207 |
| 9,734,649 | B2* | 8/2017 | Yoon | G07D 7/202 |
| 2004/0164248 | A1* | 8/2004 | Nago | G07D 7/1205 |
| | | | | 250/341.7 |
| 2004/0240722 | A1* | 12/2004 | Tsuji | G07D 7/121 |
| | | | | 382/137 |
| 2006/0066738 | A1 | 3/2006 | Hershey et al. | |
| 2006/0115139 | A1* | 6/2006 | Joshi | G07D 7/121 |
| | | | | 382/135 |
| 2006/0159329 | A1* | 7/2006 | Joshi | G07D 7/121 |
| | | | | 382/135 |
| 2006/0163504 | A1* | 7/2006 | Fujimoto | G07D 7/121 |
| | | | | 250/559.45 |
| 2006/0279745 | A1* | 12/2006 | Wenstrand | G01S 3/784 |
| | | | | 356/614 |
| 2008/0273255 | A1* | 11/2008 | Yang | G02B 7/023 |
| | | | | 359/819 |
| 2008/0315104 | A1* | 12/2008 | Nam | H01L 27/14603 |
| | | | | 250/370.08 |
| 2009/0105605 | A1* | 4/2009 | Abreu | A61B 5/0008 |
| | | | | 600/549 |
| 2009/0159659 | A1* | 6/2009 | Norris | G06Q 20/042 |
| | | | | 235/379 |
| 2009/0278048 | A1 | 11/2009 | Choe et al. | |
| 2010/0025980 | A1* | 2/2010 | Choi | D01F 1/06 |
| | | | | 283/92 |
| 2011/0124405 | A1* | 5/2011 | Okada | G07D 7/12 |
| | | | | 463/25 |
| 2011/0134293 | A1* | 6/2011 | Tanaka | G02B 7/34 |
| | | | | 348/280 |
| 2011/0309462 | A1* | 12/2011 | Sargent | H01L 27/1461 |
| | | | | 257/443 |
| 2012/0127543 | A1 | 5/2012 | Okada et al. | |
| 2013/0038914 | A1* | 2/2013 | Yoshida | H04N 1/0285 |
| | | | | 358/474 |
| 2013/0077136 | A1* | 3/2013 | Motoyama | H04N 1/04 |
| | | | | 358/498 |
| 2013/0188057 | A1* | 7/2013 | Lin | H04N 5/33 |
| | | | | 348/164 |
| 2013/0265617 | A1* | 10/2013 | Murakami | G02B 6/0001 |
| | | | | 358/448 |
| 2013/0314544 | A1* | 11/2013 | Ban | H04N 5/2354 |
| | | | | 348/164 |
| 2014/0168372 | A1* | 6/2014 | Chang | H04N 13/0253 |
| | | | | 348/46 |
| 2014/0183337 | A1* | 7/2014 | Hu | H01L 27/14621 |
| | | | | 250/208.1 |
| 2014/0209789 | A1* | 7/2014 | Hu | H01L 27/14641 |
| | | | | 250/208.2 |
| 2015/0092018 | A1* | 4/2015 | Kang | G01S 17/42 |
| | | | | 348/46 |
| 2016/0022126 | A1* | 1/2016 | Ramesh | H04N 5/332 |
| | | | | 600/109 |
| 2017/0150071 | A1* | 5/2017 | Otsubo | H04N 5/332 |
| 2018/0047773 | A1* | 2/2018 | Gomi | H01L 27/14621 |
| 2018/0056702 | A1* | 3/2018 | Watanabe | B42D 25/36 |

FOREIGN PATENT DOCUMENTS

| | | |
|---|---|---|
| JP | 2003-110801 A | 4/2003 |
| JP | 2005-72976 A | 3/2005 |
| JP | 2006-148690 A | 6/2006 |
| JP | 2012-68731 A | 4/2012 |

* cited by examiner

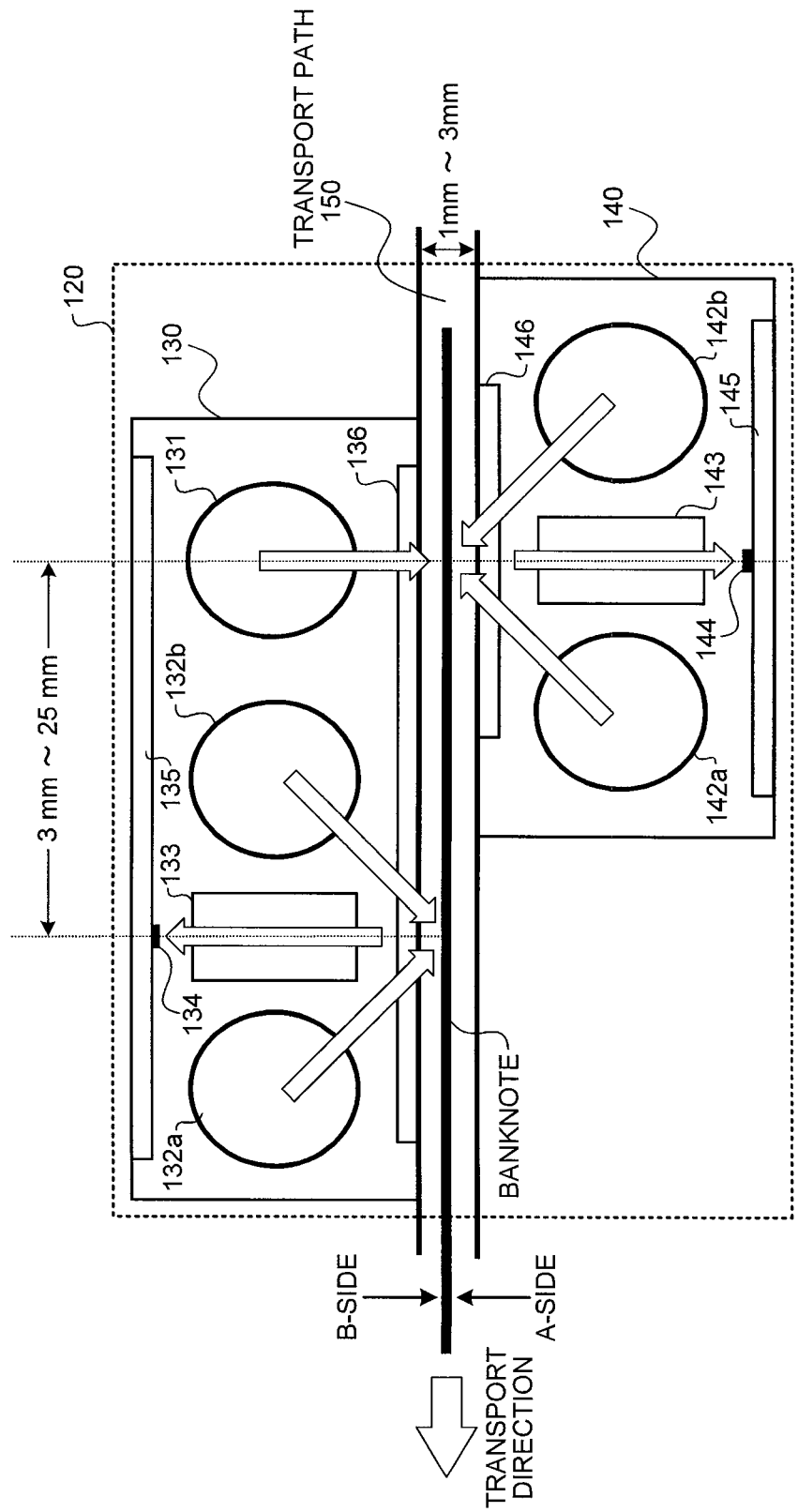

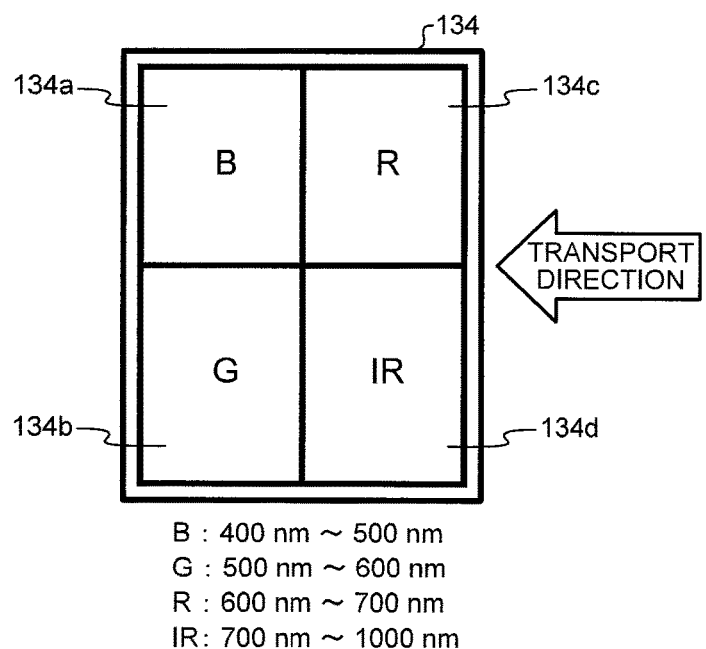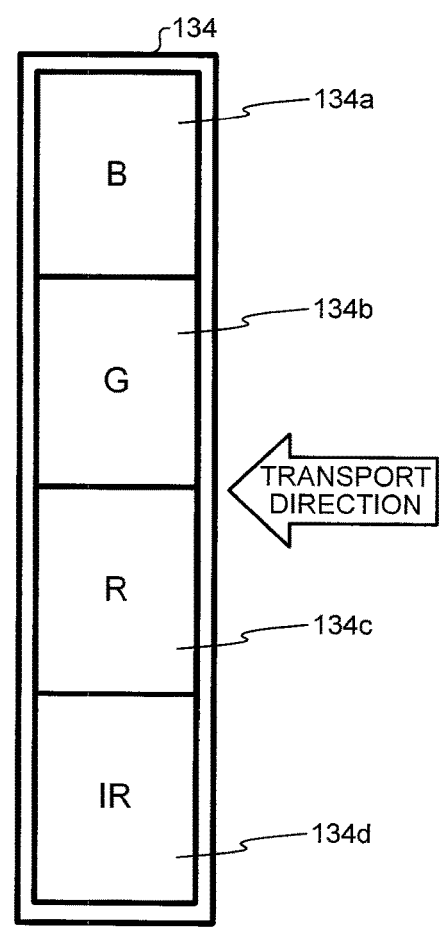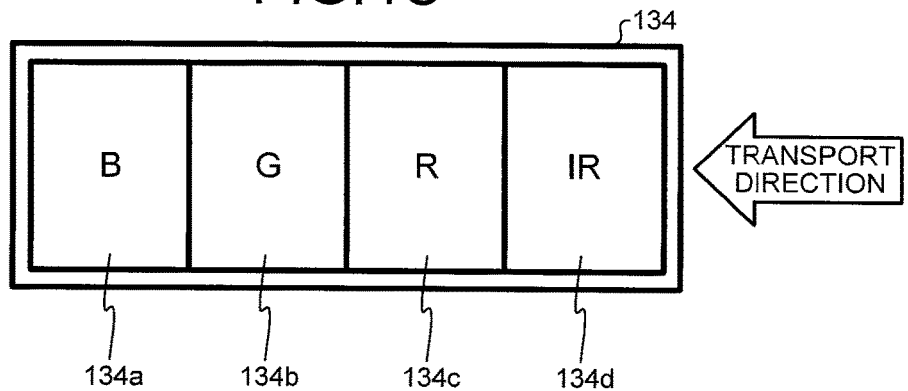

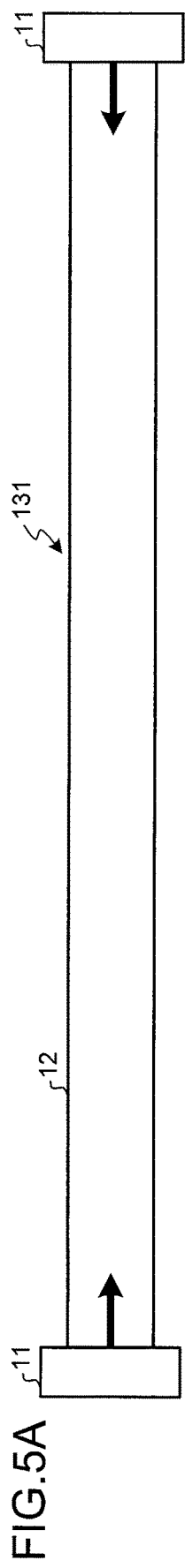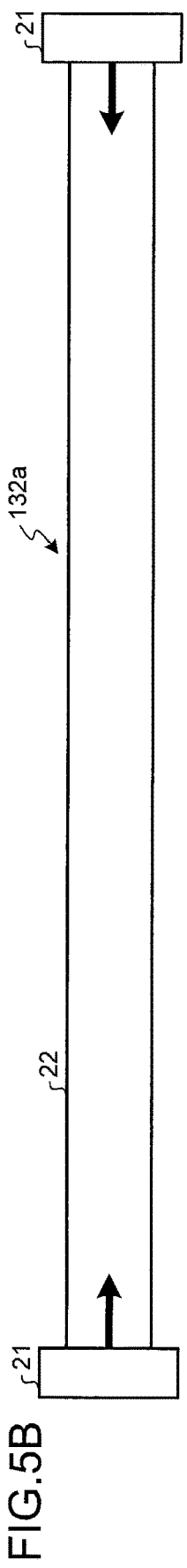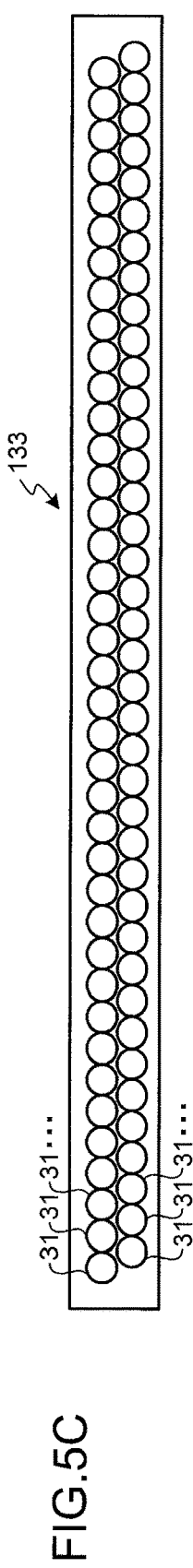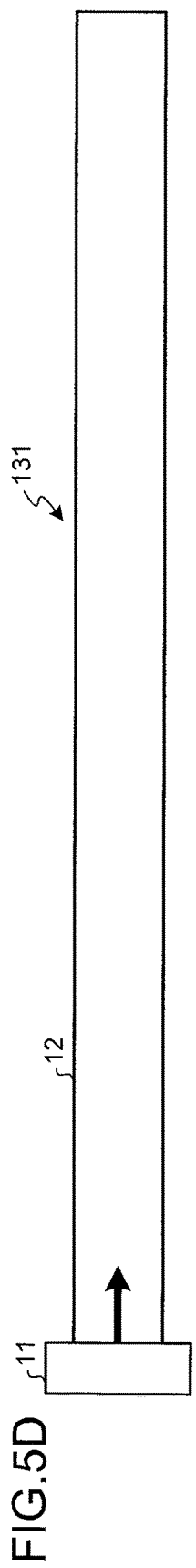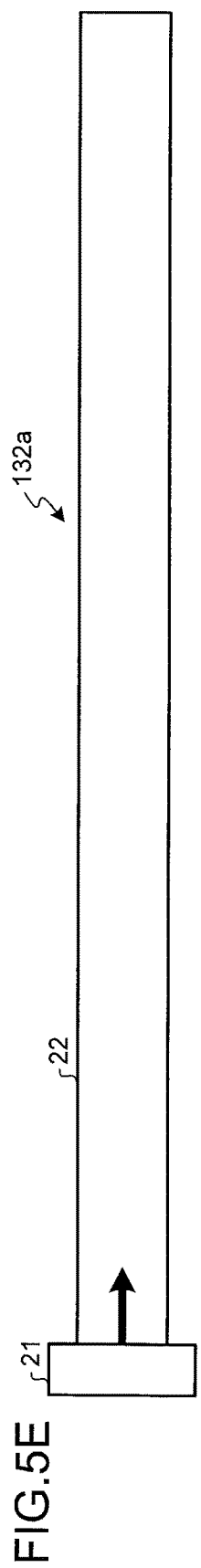

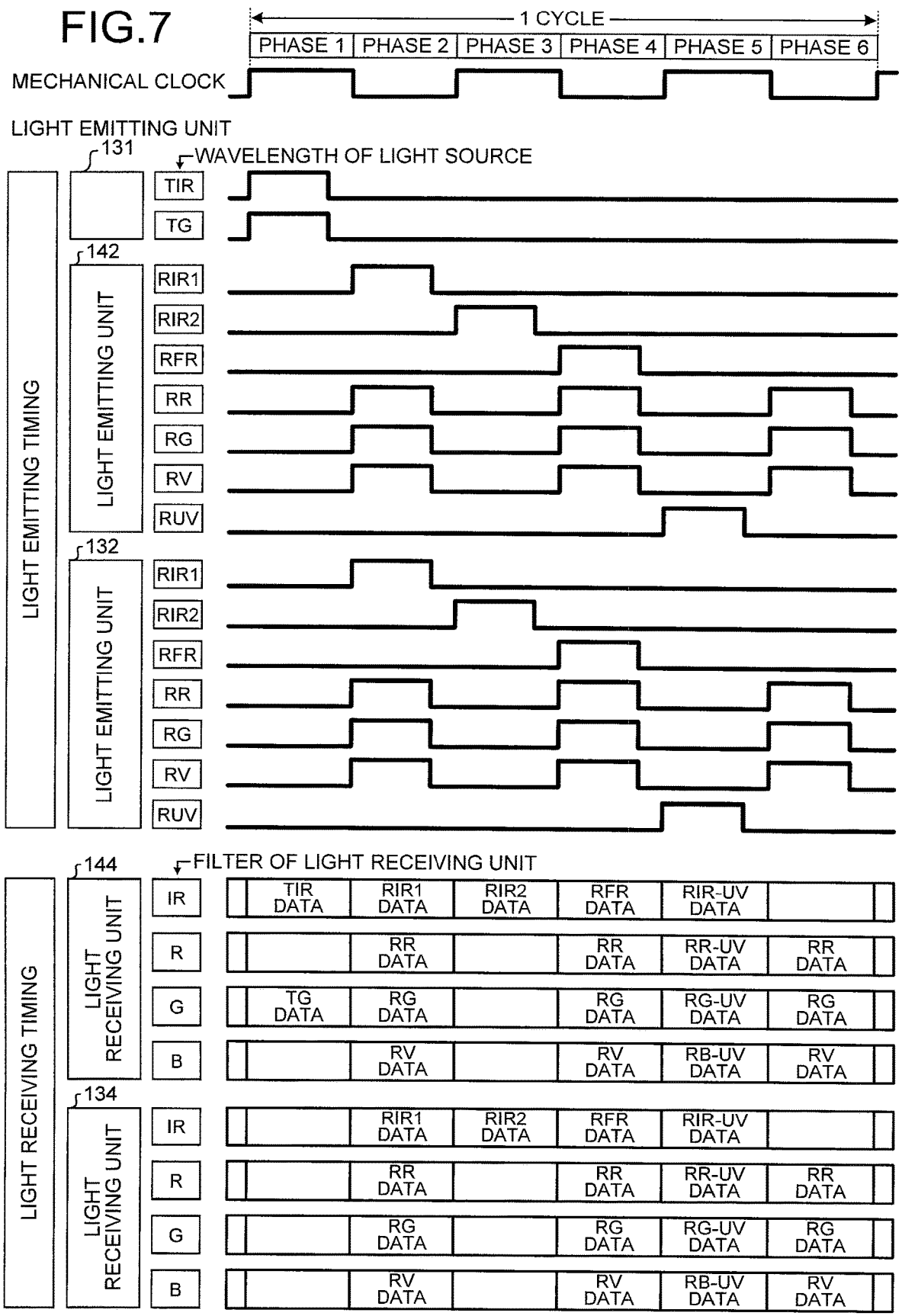

FIG.9A
WHEN ONE LVDS IS USED FOR ONE CLOCK OF 132 MHz

| LVDS #1 | 9 bit OF R | 9 bit OF B |
|---|---|---|
| | 8 bit OF R | 8 bit OF B |
| | 7 bit OF R | 7 bit OF B |
| | 6 bit OF R | 6 bit OF B |
| | 5 bit OF R | 5 bit OF B |
| | 4 bit OF R | 4 bit OF B |
| | 3 bit OF R | 3 bit OF B |
| | 2 bit OF R | 2 bit OF B |
| | 1 bit OF R | 1 bit OF B |
| | 0 bit OF R | 0 bit OF B |
| | 9 bit OF G | 9 bit OF IR |
| | 8 bit OF G | 8 bit OF IR |
| | 7 bit OF G | 7 bit OF IR |
| | 6 bit OF G | 6 bit OF IR |
| | 5 bit OF G | 5 bit OF IR |
| | 4 bit OF G | 4 bit OF IR |
| | 3 bit OF G | 3 bit OF IR |
| | 2 bit OF G | 2 bit OF IR |
| | 1 bit OF G | 1 bit OF IR |
| | 0 bit OF G | 0 bit OF IR |

FIG.9B
WHEN TWO LVDS ARE USED FOR ONE CLOCK OF 66 MHz

| LVDS #1 | 9 bit OF R |
|---|---|
| | 8 bit OF R |
| | 7 bit OF R |
| | 6 bit OF R |
| | 5 bit OF R |
| | 4 bit OF R |
| | 3 bit OF R |
| | 2 bit OF R |
| | 1 bit OF R |
| | 0 bit OF R |
| | 9 bit OF G |
| | 8 bit OF G |
| | 7 bit OF G |
| | 6 bit OF G |
| | 5 bit OF G |
| | 4 bit OF G |
| | 3 bit OF G |
| | 2 bit OF G |
| | 1 bit OF G |
| | 0 bit OF G |
| LVDS #2 | 9 bit OF B |
| | 8 bit OF B |
| | 7 bit OF B |
| | 6 bit OF B |
| | 5 bit OF B |
| | 4 bit OF B |
| | 3 bit OF B |
| | 2 bit OF B |
| | 1 bit OF B |
| | 0 bit OF B |
| | 9 bit OF IR |
| | 8 bit OF IR |
| | 7 bit OF IR |
| | 6 bit OF IR |
| | 5 bit OF IR |
| | 4 bit OF IR |
| | 3 bit OF IR |
| | 2 bit OF IR |
| | 1 bit OF IR |
| | 0 bit OF IR |

B: 400 nm ~ 500 nm
G: 500 nm ~ 600 nm
R: 600 nm ~ 700 nm
FR: 700 nm ~ 800 nm
IR2: 800 nm ~ 900 nm
IR1: 900 nm ~ 1000 nm

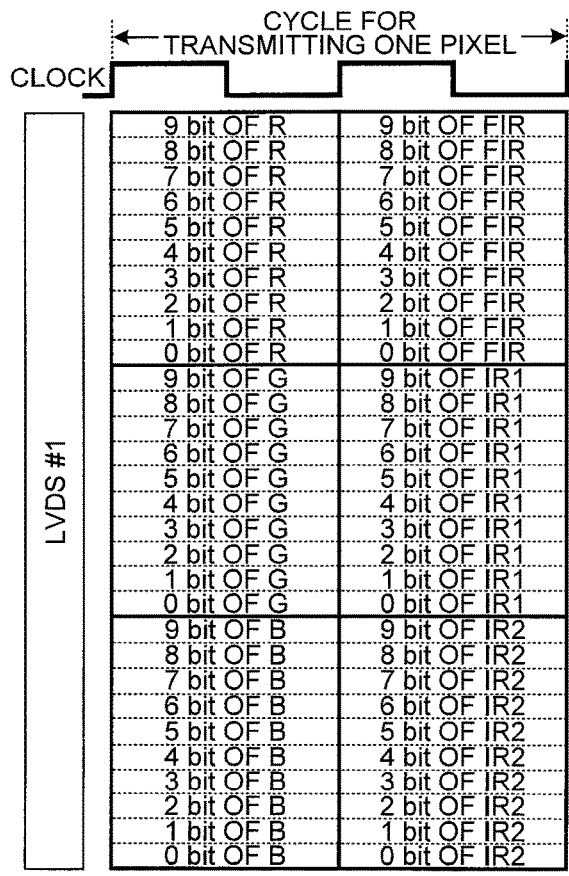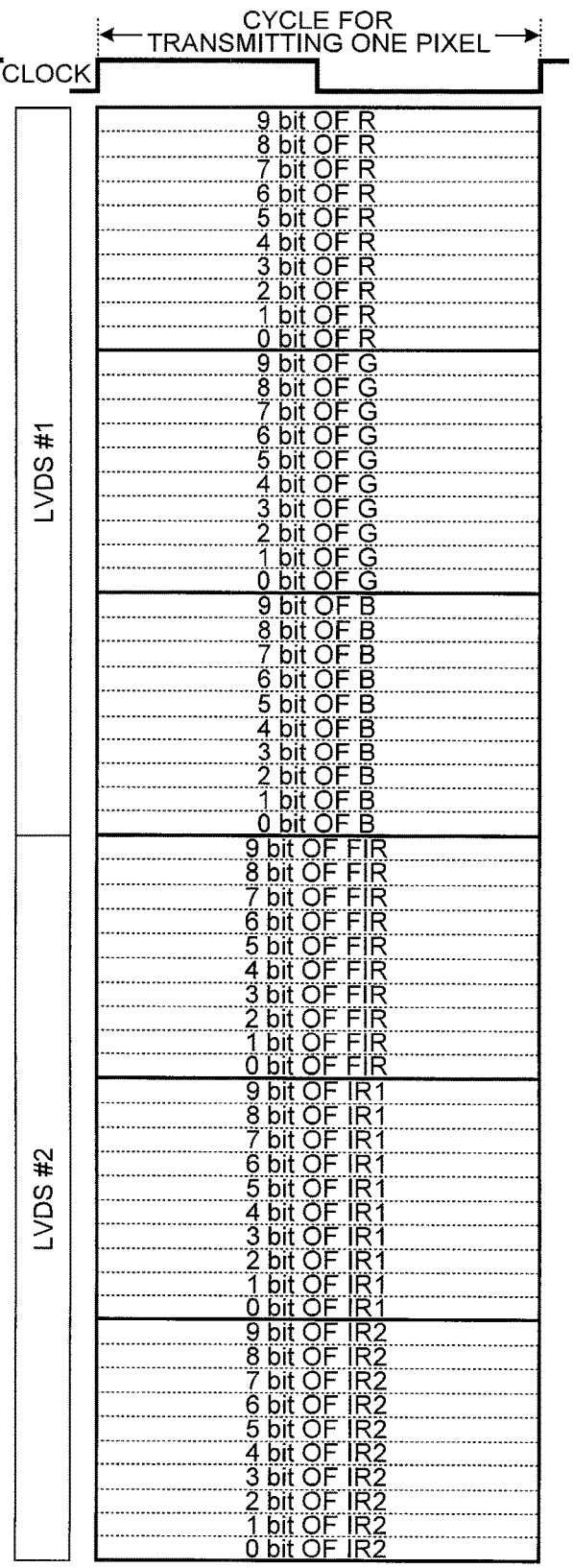
FIG.14A WHEN ONE LVDS IS USED FOR ONE CLOCK OF 132 MHz
FIG.14B WHEN TWO LVDS ARE USED FOR ONE CLOCK OF 66 MHz

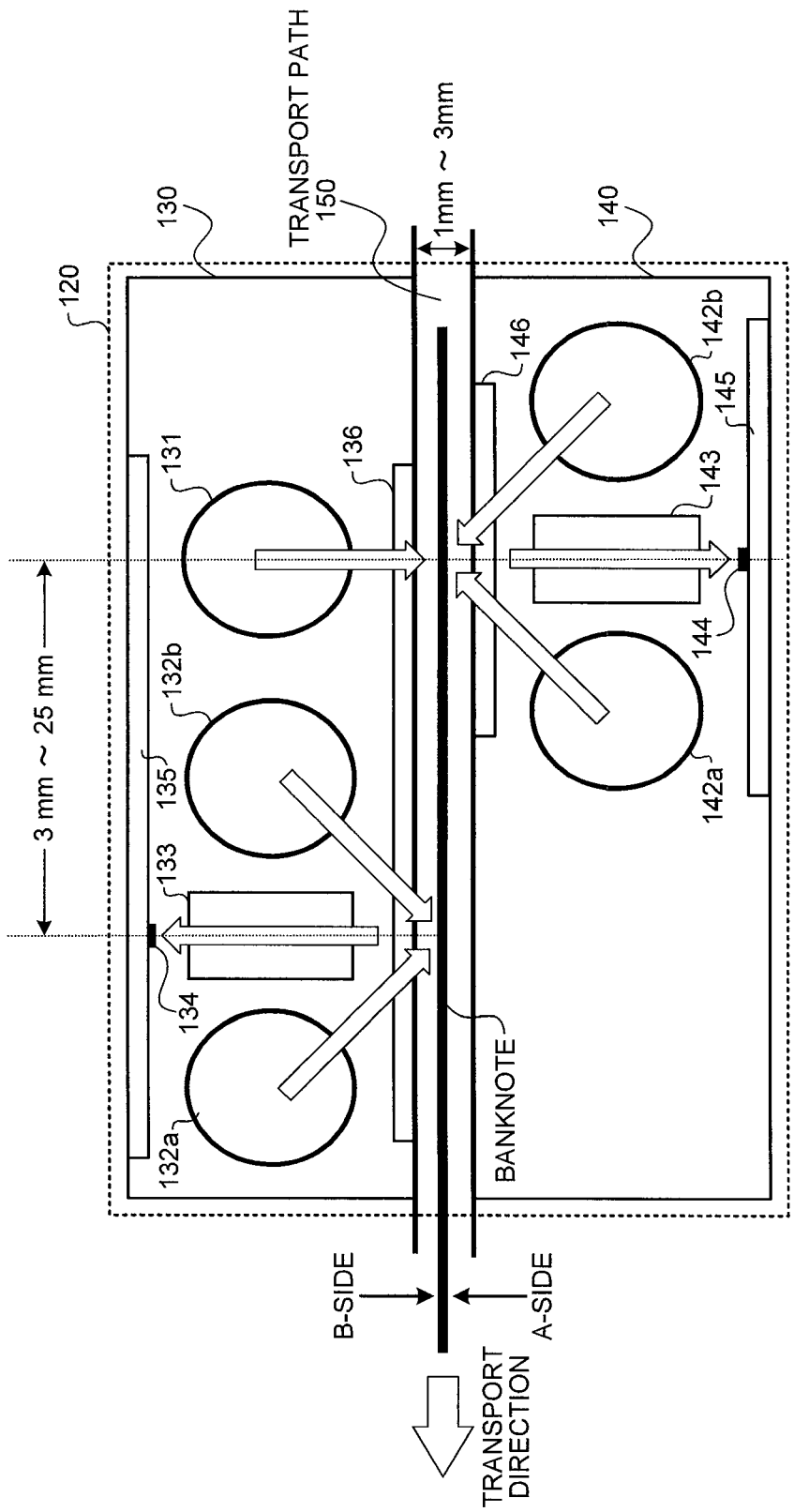

LIGHT RECEIVING SENSOR, SENSOR MODULE, AND PAPER SHEET HANDLING APPARATUS

TECHNICAL FIELD

The present invention relates to a light receiving sensor, a sensor module, and a paper sheet handling apparatus that can efficiently prevent degradation in resolution and accuracy of each of an image when forming images relating to a plurality of visible lights of different wavelength bands and an image of infrared light.

BACKGROUND ART

A technique of irradiating a banknote with lights of different wavelength bands, and forming an image relating to each of the wavelength bands based on a light intensity of light reflected from the banknote is known in the art. For example, Patent Document 1 discloses a technique in which a plurality of light emitting elements are used as light sources that emit visible lights of respectively different wavelength bands, a banknote is irradiated with the visible light while sequentially turning on/off each of the light emitting elements, a light intensity of the visible light reflected from the banknote is detected with a respective light receiving element, and images are formed in which pixel values represent the light intensities of the detected reflected lights.

However, in the method disclosed in Patent Document 1 in which a banknote is irradiated with visible light while sequentially turning on/off each of the light emitting elements, the opportunity of detecting the light intensity of the reflected light is disadvantageously decreased in comparison to a method in which turning on of one light emitting element is repeated. For example, assume a case in which light emitting elements corresponding to red light, green light, and blue light, are sequentially turned on. In this case, although it is possible to form an image of the red light, an image of the green light, and an image of the blue light, the opportunity of detection for the image of the red light is reduced to ⅓ in comparison to a case in which turning on of only the light emitting element corresponding to the red light is repeated. As a result, the resolution in the sub-scanning direction, which is a transport direction of the banknote, is decreased to ⅓.

Patent Document 2, for example, discloses a technique to prevent such degradation of the resolution. In this technique, three light emitting elements corresponding to the red light, the green light, and the blue light are turned on simultaneously, and three light receiving elements each covered with a color filter of red, green, and blue, respectively, are used. Accordingly, it is possible to prevent the decrease in the opportunity to detect the light intensity of the reflected light, and the same resolution as that obtained when the turning on of only the light emitting element of the red light is repeated can be obtained.

CITATION LIST

Patent Document

[Patent Document 1] Japanese Patent Application Laid-Open No. 2003-46726
[Patent Document 2] Japanese Patent Application Laid-Open No. 2012-68731

SUMMARY OF INVENTION

Technical Problem

However, in the technique disclosed in Patent Document 2, because each color filter allows the infrared light to pass therethrough, the light intensity of the infrared light is superposed on the light intensity of the light reflected from the banknote. As a result, the pixel values of the image of the red light, for example, are obtained as a total of the light intensity of the red light and the light intensity of the infrared light (i.e., light intensity of red light+light intensity of infrared light) whereby the accuracy of the image decreases.

Particularly, if authenticity, a degree of damage, and the like of a banknote is to be determined, it is desirable to provide an infrared light emitting element that emits infrared light, and to form an infrared image by using the light intensity of the infrared light reflected from the banknote. However, the infrared light emitted by the infrared light emitting element passes through the color filter of each of the visible lights (the red light, the green light, and the blue light), and, as a result, the precision of the image of each of the visible lights decreases.

If the accuracy of the image of each of the visible lights is to be secured, it is necessary to set the light emitting timings of each of the light emitting elements of the red light, the green light, and the blue light to be different from the light emitting timing at which the infrared light is emitted from the infrared light emitting element. However, this results in degradation in the resolution of the image of each of the visible lights and the image of the infrared light.

Thus, how to efficiently prevent the degradation in resolution and accuracy of each of an image when forming images of a banknote relating to a plurality of visible lights of different wavelength bands and an image of infrared light is an important issue that needs to be addressed. This issue needs to be addressed not only for banknotes but also for other paper sheets such as checks and bills.

The present invention is intended to solve a problem in the conventional technology. It is an object of the present invention to provide a light receiving sensor, a sensor module, and a paper sheet handling apparatus that can efficiently prevent degradation in resolution and accuracy of each of an image when forming images relating to a plurality of visible lights of different wavelength bands and an image of infrared light.

Means for Solving Problems

To solve the above problem, and to achieve the above object, a light receiving sensor according to one aspect of the present invention includes a filter that includes at least a first filter region that allows visible light of a first wavelength band to pass therethrough while blocking visible light of other wavelength bands and infrared light; a second filter region that allows visible light of a second wavelength band, which is different from the first wavelength band or a part of which overlaps with the first wavelength band, to pass therethrough while blocking visible light of other wavelength bands and infrared light; a third filter region that allows visible light of a third wavelength band, which is different from the first wavelength band and the second wavelength band or a part of which overlaps with the first wavelength band and the second wavelength band, to pass therethrough while blocking visible light of other wavelength bands and infrared light; and a fourth filter region that allows the infrared light to pass therethrough while blocking visible light; and a light receiving unit that includes at least a first light receiving element that detects the visible light that passes through the first filter region; a second light receiving element that detects the visible light that passes through the second filter region; a third light receiving element that detects the visible light that passes through the third filter region; and an infrared-light receiving element that detects the infrared light that passes through the fourth filter region.

In the above light receiving sensor, the fourth filter region further includes a fifth filter region that allows infrared light of a fourth wavelength band to pass therethrough while blocking infrared light of other wavelength bands and visible light and that allows infrared light of a fifth wavelength band, which is different from the fourth wavelength band or a part of which overlaps with the fourth wavelength band, to pass therethrough while blocking infrared light of other wavelength bands and visible light; and a sixth filter region that allows infrared light of a sixth wavelength band, which is different from the fourth wavelength band and the fifth wavelength band or a part of which overlaps with the fourth wavelength band and the fifth wavelength band, to pass therethrough while blocking the infrared light of other wavelength bands and the visible light, and the infrared-light receiving element includes a fourth light receiving element that detects the infrared light that passes through the fourth filter region; a fifth light receiving element that detects the infrared light that passes through the fifth filter region; and a sixth light receiving element that detects the infrared light that passes through the sixth filter region.

A light receiving sensor according to another aspect of the present invention includes a filter that includes a plurality of filter regions each of which allows visible light of a plurality of different wavelength bands to pass therethrough while blocking visible light of other wavelength bands and infrared light; and one or a plurality of filter regions each of which allows infrared light of one or a plurality of wavelength bands to pass therethrough while blocking visible light; and a light receiving unit that includes a plurality of light receiving elements each of which detects each of the visible light of the plurality of the different wavelength bands and infrared light of the one or the plurality of the wavelength bands that passes through each of the filter regions.

A sensor module according to still another aspect of the present invention includes a light emitting unit that emits light including at least visible light and infrared light on an object; a filter that receives light from the object and includes at least a first filter region that allows visible light of a first wavelength band to pass therethrough while blocking visible light of other wavelength bands and infrared light; a second filter region that allows visible light of a second wavelength band, which is different from the first wavelength band or a part of which overlaps with the first wavelength band, to pass therethrough while blocking visible light of other wavelength bands and infrared light; a third filter region that allows visible light of a third wavelength band, which is different from the first wavelength band and the second wavelength band or a part of which overlaps with the first wavelength band and the second wavelength band, to pass therethrough while blocking visible light of other wavelength bands and infrared light; and a fourth filter region that allows infrared light to pass therethrough while blocking visible light; a light receiving unit that includes at least a first light receiving element that detects the visible light that passes through the first filter region; a second light receiving element that detects the visible light that passes through the second filter region; a third light receiving element that detects the visible light that passes through the third filter region; and an infrared-light receiving element that detects the infrared light that passes through the fourth filter region; and an outputting unit that outputs first light receiving data detected in the first light receiving element, second light receiving data detected in the second light receiving element, third light receiving data detected in the third light receiving element, and infrared-light light receiving data detected in the infrared-light receiving element.

In the above sensor module, the fourth filter region further includes a fifth filter region that allows infrared light of a fourth wavelength band to pass therethrough while blocking infrared light of other wavelength bands and visible light, and that allows infrared light of a fifth wavelength band, which is different from the fourth wavelength band or a part of which overlaps with the fourth wavelength band, to pass therethrough while blocking infrared light of other wavelength bands and visible light; and a sixth filter region that allows infrared light of a sixth wavelength band, which is different from the fourth wavelength band and the fifth wavelength band or a part of which overlaps with the fourth wavelength band and the fifth wavelength band, to pass therethrough while blocking infrared light of other wavelength bands and visible light. The infrared-light receiving element includes a fourth light receiving element that detects the infrared light that passes through the fourth filter region; a fifth light receiving element that detects the infrared light that passes through the fifth filter region; and a sixth light receiving element that detects the infrared light that passes through the sixth filter region. The outputting unit outputs the first light receiving data detected in the first light receiving element, the second light receiving data detected in the second light receiving element, the third light receiving data detected in the third light receiving element, fourth light receiving data detected in the fourth light receiving element, fifth light receiving data detected in the fifth light receiving element, and sixth light receiving data detected in the sixth light receiving element.

In the above sensor module, the outputting unit outputs, in parallel, the first light receiving data, the second light receiving data, the third light receiving data, and the fourth light receiving data as signals of a low voltage differential signaling method.

In the above sensor module, the outputting unit outputs, in parallel, the first light receiving data, the second light receiving data, the third light receiving data, the fourth light receiving data, the fifth light receiving data, and the sixth light receiving data as signals of a low voltage differential signaling method.

In the above sensor module, the light emitting unit includes a visible-light emitting element that emits white light including the first wavelength band, the second wavelength band, and the third wavelength band; a first infrared-light emitting element that emits infrared light of the fourth wavelength band; a second infrared-light emitting element that emits infrared light of the fifth wavelength band different from the fourth wavelength band; a third infrared-light emitting element that emits infrared light of the sixth wavelength band different from the fourth wavelength band and the fifth wavelength band; and a control unit that provides a control to cause the first infrared-light emitting element to emit light at a first light emitting timing, the second infrared-light emitting element to emit light at a second light emitting timing different from the first light emitting timing, and the third infrared-light emitting element to emit light at a third light emitting timing different from the first light emitting timing and the second light emitting timing.

In the above sensor module, the outputting unit outputs, in parallel: the first light receiving data, the second light receiving data, the third light receiving data, and the fourth light receiving data as a signal of a low voltage differential signaling method in response to the first light emitting timing; the first light receiving data, the second light receiving data, the third light receiving data, and the fourth light receiving data as a signal of a low voltage differential signaling method in response to the second light emitting timing; and the first light receiving data, the second light receiving data, the third light receiving data, and the fourth light receiving data as a signal of a low voltage differential signaling method in response to the third light emitting timing.

In the above sensor module, the light emitting unit includes an ultraviolet-light emitting element that emits light including ultraviolet light; and an ultraviolet-light transmission filter that blocks at least one of visible light and infrared light among the light emitted by the ultraviolet-light emitting element, and the control unit provides a control to cause the ultraviolet-light emitting element to emit light at a fourth light emitting timing that is different from each of the first light emitting timing, the second light emitting timing, and the third light emitting timing.

In the above sensor module, the light emitting unit further includes a light guide which guides the white light, the infrared light of the fourth wavelength band, the infrared light of the fifth wavelength band, and the infrared light of the sixth wavelength band, which are input from one or a plurality of input ends, to a predetermined output end.

In the above sensor module, the light emitting unit includes a visible-light emitting element that emits white light including the first wavelength band, the second wavelength band, and the third wavelength band; an infrared-light emitting element that emits infrared light; and a control unit that controls a light emitting timing of the visible-light emitting element and the infrared-light emitting element so that the light emitting timings have an overlap.

In the above sensor module, the visible-light emitting element includes a first visible-light emitting element that emits the visible light of the first wavelength band; a second visible-light emitting element that emits the visible light of the second wavelength band; and a third visible-light emitting element that emits the visible light of the third wavelength band, and the control unit controls the first visible-light emitting element, the second visible-light emitting element, the third visible-light emitting element, and the infrared-light emitting element so that light emitting timings thereof have an overlap.

In the above sensor module, the infrared-light emitting element includes a first infrared-light emitting element that emits the infrared light of the fourth wavelength band; a second infrared-light emitting element that emits the infrared light of the fifth wavelength band different from the fourth wavelength band; and a third infrared-light emitting element that emits the infrared light of the sixth wavelength band different from the fourth wavelength band and the fifth wavelength band.

In the above sensor module, the light emitting unit includes an ultraviolet-light emitting element that emits light including an ultraviolet light; and an ultraviolet-light transmission filter that blocks at least one of the visible light and the infrared light among the lights emitted by the ultraviolet-light emitting element, and the control unit controls the visible-light emitting element and the infrared-light emitting element to emit light at the first light emitting timing so as to have an overlap, and the ultraviolet-light emitting element to emit the light at the second light emitting timing different from the first light emitting timing.

In the above sensor module, the light emitting unit further includes a light guide which guides the white light, the infrared light of the fourth wavelength band, the infrared light of the fifth wavelength band, and the infrared light of the sixth wavelength band, which are input from one or a plurality of input ends, to a predetermined output end.

A paper sheet handling apparatus according to still another aspect of the present invention includes a sensor module that detects visible light and infrared light that pass through a paper sheet being transported or detects visible light and infrared light reflected from the paper sheet, and an image formation processing unit that forms an image relating to the paper sheet based on the visible light and the infrared light detected by the sensor module. The sensor module includes a light emitting unit that emits light including at least the visible light and the infrared light; and a filter that receives reflected light from the paper sheet and transmissive light passed through the paper sheet while the light emitting unit emits light to the paper sheet being transported, and has a plurality of filter regions each of which allows visible light of a plurality of different wavelength bands to pass therethrough while blocking visible light of other wavelength bands and infrared light; and one or a plurality of filter regions each of which allows infrared light of one or a plurality of wavelength bands to pass therethrough while blocking visible light; a light receiving unit having a plurality of light receiving elements each of which detects visible light of the plurality of the different wavelength bands that pass through each of the filter regions, and detects infrared light of the one or the plurality of the different wavelength bands; and an outputting unit that outputs each light receiving data detected by the light receiving elements to the image formation processing unit.

In the above paper sheet handling apparatus, the image formation processing unit receives in parallel each of the light receiving data detected by the light receiving elements, and based on the received light receiving data forms a visible light image and an infrared light image for each of the different wavelength bands.

In the above paper sheet handling apparatus, the light emitting unit provides a control to emit the visible light and the infrared light in a first light emitting timing so as to have an overlap, and irradiates an excitation light of a wavelength band different from the wavelength band of the visible light and the infrared light at a second light emitting timing different from the first light emitting timing, and the light receiving unit detects in the light receiving elements light emitted from the paper sheet in response to the irradiation of the excitation light by the light emitting unit.

In the above paper sheet handling apparatus, in the light receiving unit, the light receiving elements are arranged linearly in a main-scanning direction or a sub-scanning direction of the paper sheet, or are arranged in an array in the main-scanning direction and the sub-scanning direction.

Advantageous Effects of Invention

According to the present invention, because the filter that includes at least the first filter region that allows the visible light of the first wavelength band to pass therethrough while blocking visible light of other wavelength bands and infrared light; the second filter region that allows the visible light of the second wavelength band, a part of the wavelength band of which overlaps with the first wavelength band or which has a wavelength band different from the first wavelength band, to pass therethrough while blocking the visible light of other wavelength bands and the infrared light; the third filter region that allows the visible light of the third wavelength band, a part of the wavelength band of which overlaps with the first wavelength band and the second wavelength band or which has a wavelength band different from the first wavelength band and the second wavelength band, to pass therethrough while blocking the visible light of other wavelength bands and the infrared light; and the fourth filter region that allows the infrared light to pass therethrough while blocking the visible light; and the light receiving unit that includes at least the first light receiving element that detects the visible light that passes through the first filter region; the second light receiving element that detects the visible light that passes through the second filter region; the third light receiving element that detects the visible light that passes through the third filter region; and the infrared-light receiving element that detects the infrared light that passes through the fourth filter region are provided, degradation in resolution and accuracy of each of an image when forming images relating to a plurality of visible lights of different wavelength bands and an image of infrared light can be prevented efficiently.

BRIEF DESCRIPTION OF DRAWINGS

FIG. 3 is a cross-section of a line sensor of the banknote handling apparatus shown in FIG. 2 when the line sensor is cut in a plane that is orthogonal to a transport surface of the banknote but parallel to a transport direction of the banknote.

FIGS. 4A to 4C are schematic diagrams depicting an arrangement of light receiving elements of a light receiving unit of a line sensor according to the first embodiment, and a correspondence thereof with optical filters.

FIGS. 5A to 5E are schematic diagrams depicting the detailed configuration of a light emitting unit and a condenser lens shown in FIG. 3.

FIG. 7 is a timing chart depicting light emitting timings of the light emitting units and light receiving timings of the light receiving units according to the first embodiment of the line sensor shown in FIG. 3.

FIGS. 9A and 9B are schematic diagrams depicting a configuration of transmission data according to the first embodiment that is transmitted to a control unit from the line sensor shown in FIG. 8 that employs an LVDS (Low Voltage Differential Signaling) interface.

FIGS. 14A and 14B are schematic diagrams depicting a configuration of transmission data according to the second embodiment that is transmitted to a control unit from the line sensor shown in FIG. 13 that employs an LVDS interface.

FIG. 15 depicts a variation of the line sensor shown in FIG. 3.

DESCRIPTION OF EMBODIMENTS

Exemplary embodiments of a light receiving sensor, a sensor module, and a paper sheet handling apparatus according to the present invention are explained below in detail while referring to the accompanying drawing.

First Embodiment

Figure 1:
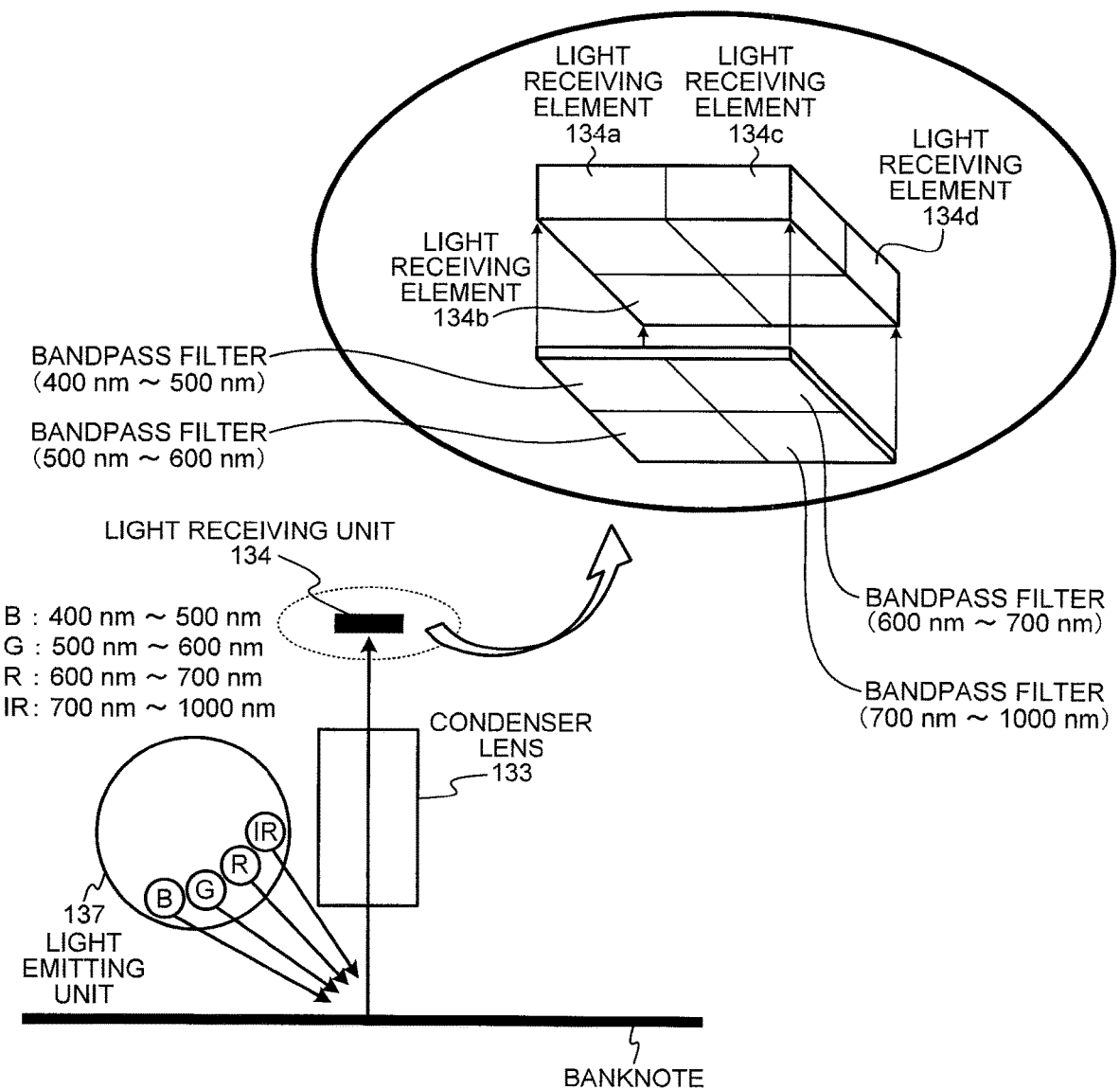
FIG. 1 is an explanatory drawing for explaining a concept of an image forming method of a banknote performed by a banknote handling apparatus according to the present invention.

At first, a concept of an image forming method of a banknote performed by a banknote handling apparatus 100 according to the present invention is explained by using FIG. 1. FIG. 1 is a schematic diagram depicting characteristic features of a configuration of a light emitting unit 137 and a light receiving unit 134 relating to image formation of a banknote.

The light emitting unit 137 includes a blue light source (B) of a wavelength band of 400 nm to 500 nm, a green light source (G) of a wavelength band of 500 nm to 600 nm, a red light source (R) of a wavelength band of 600 nm to 700 nm, and an infrared light source (IR) of a wavelength band of 700 nm to 1000 nm. The light emitting unit 137 turns on these light sources such that lighting timings thereof have overlaps. The light sources of four wavelength bands of the light emitting unit 137 irradiate a banknote with respective lights while overlapping the lighting timings thereof, a condenser lens 133 condenses the light reflected from the banknote on the light receiving unit 134, and the light receiving unit 134 measures a received light intensity of the condensed reflected light.

As shown in the right side of FIG. 1, the light receiving unit 134 includes four light receiving elements 134a to 134d, and each of the light receiving elements 134a to 134d is provided with a bandpass filter that transmits only light of a specific wavelength band. Specifically, the light receiving element 134a is provided with a bandpass filter that passes only the light of the wavelength band of 400 nm to 500 nm, the light receiving element 134b is provided with a bandpass filter that passes only the light of the wavelength band of 500 nm to 600 nm, the light receiving element 134c is provided with a bandpass filter that passes only the light of the wavelength band of 600 nm to 700 nm, and the light receiving element 134d is provided with a bandpass filter that passes only the light of the wavelength band of 700 nm to 1000 nm.

Therefore, even if the banknote is irradiated with the lights of four wavelength bands from the light emitting unit 137 while overlapping the light emitting timings thereof and lights reflected from the banknote corresponding to the lights of the four wavelength bands are simultaneously received in the light receiving unit 134, because lights of unnecessary wavelength bands among the received lights are filtered out by the respective bandpass filters corresponding to each of the wavelength bands, it is possible to acquire received light intensities of each of the wavelength bands in the light receiving elements 134a to 134d. The conventional light receiving unit did not have the bandpass filters provided for the light receiving unit 134 shown in FIG. 1. Therefore, to obtain a received light intensity of a reflected light for each of the wavelength bands of the emitted lights, it was necessary to sequentially turn on/off the lights of the four wavelength bands one by one, and acquire the received light intensity in a state in which only one of those lights of a specific one wavelength band is emitted and only one of the reflected lights of a specific one wavelength band is receivable. Moreover, even if light receiving elements each of which is covered with a color filter of red, green, or blue, respectively, are used, the color filters of red, green, and blue anyway allow the infrared light to pass therethrough. Therefore, it is possible to emit visible lights of three wavelength bands while overlapping light emitting timings thereof and obtain received light intensities of the reflected light. However, it is not possible to simultaneously acquire the received light intensities of the reflected light per wavelength band of the three wavelength bands of the visible lights when the infrared light is emitted.

That is, in the configuration shown in FIG. 1, when an interval at which the received light intensity is acquired in the light receiving unit 134 and a transport speed of a banknote are set equal in the conventional technique, the sampling number of the received light intensities per wavelength band will be four times in comparison with the conventional technique in which data is acquired in a time sharing manner, and therefore, the resolution in the sub-scanning direction will be four times. Alternatively, if the resolution that is the same as in the conventional technique is sufficient, the transport speed of the banknote can be increased by four times. Moreover, even if compared to a configuration in which the light receiving elements are covered with the color filters of red, green, and blue are used, the resolution in the sub-scanning direction can be doubled or the transport speed can be doubled in the configuration shown in FIG. 1 is used.

Moreover, it is allowable to arrange six light receiving elements in a light receiving unit, divide the infrared range of 700 nm to 1000 nm into three wavelength bands and arrange three light receiving elements each having a bandpass filter that allows only the light of each of the three wavelength bands to pass therethrough. According to this configuration, image data having high resolution can be formed for each of the three wavelength bands when the infrared light is emitted.

By overlapping lighting timings of light sources that emit lights of a plurality of different wavelength bands including a wavelength band of at least visible light region and an infrared light region, the lights of the plurality of different wavelength bands including the wavelength band of at least the visible light region and the infrared light region are emitted on a banknote while securing an overlap in timings thereof. Moreover, by using light receiving elements each including a bandpass filter that allows only light of a wavelength range that corresponds to the wavelength band of each of the light sources, received light intensities of the light of the wavelength range that corresponds to the wavelength band of each of the light sources are acquired simultaneously, degradation in resolution and accuracy of each of an image when forming images relating to a plurality of visible lights of different wavelength bands and an image of infrared light can be prevented efficiently.

It is allowable to sequentially turn on/off the lights of four wavelength bands one by one and acquire the received light intensity per wavelength band in the same manner as in the conventional technique. In that case, it is possible to acquire a feature image of a banknote that includes a feature of light of a wavelength band different from the wavelength band of the emitted light.

Figure 2:
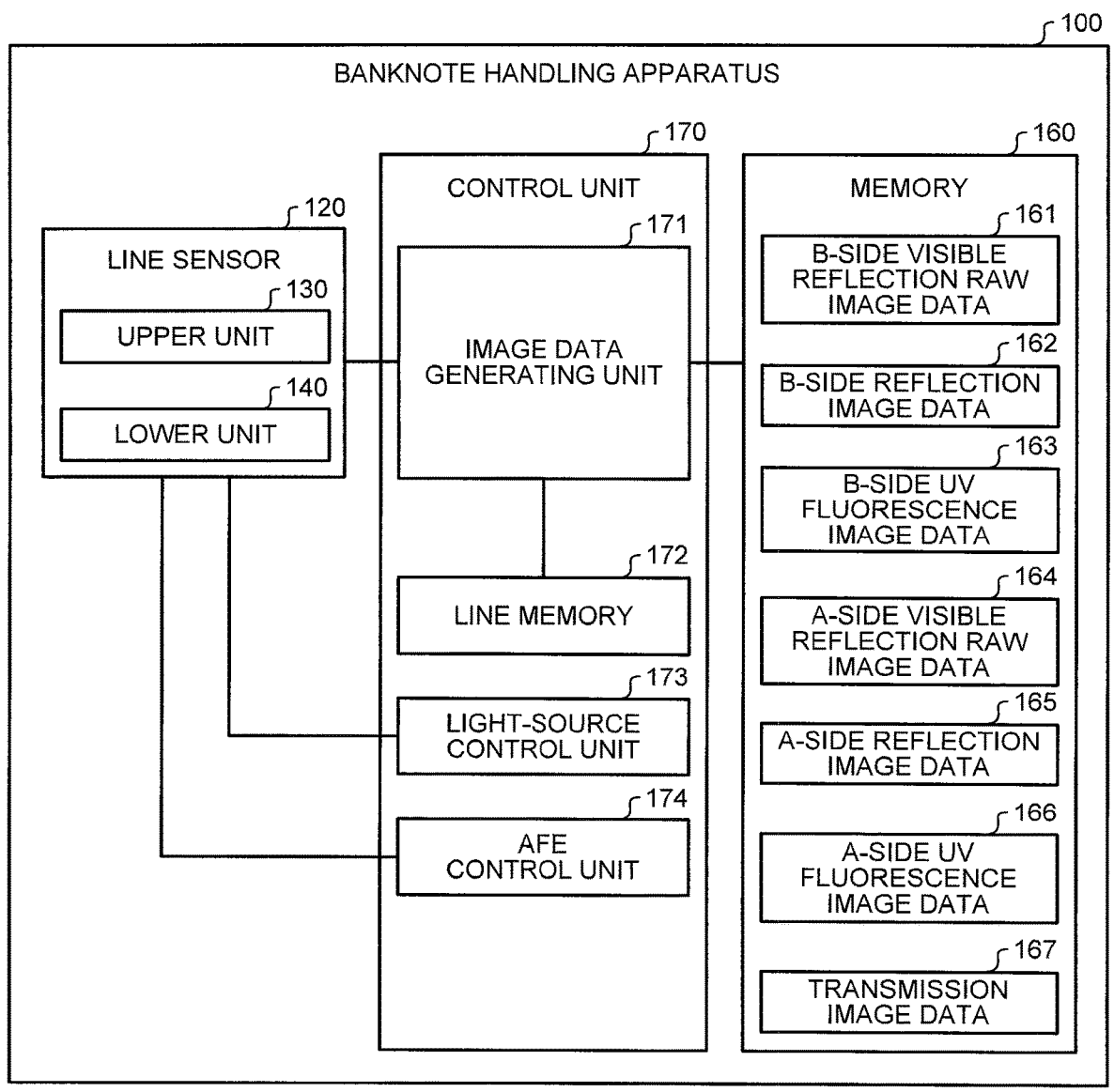
FIG. 2 is a block diagram of an internal configuration of a banknote handling apparatus according to a first embodiment.

An internal configuration of the banknote handling apparatus 100 according to the first embodiment is explained below. FIG. 2 is a block diagram of the internal configuration of the banknote handling apparatus 100 according to the first embodiment. As shown in FIG. 2, the banknote handling apparatus 100 includes a line sensor 120 that acquires information relating to an image of a banknote that is being transported, a memory 160, and a control unit 170.

The line sensor 120 includes, as shown in FIG. 2, an upper unit 130 and a lower unit 140. The upper unit 130 and the lower unit 140 are arranged across a transport path 150 along which the banknote is transported. The upper unit 130 and the lower unit 140 acquire information relating to images of both sides of the banknote. The line sensor 120 can acquire reflection data based on a reflected light reflected from each of the surfaces of the banknote when the both surfaces of the banknote are irradiated with light and acquire transmission data based on a transmissive light that passes through the banknote when the banknote is irradiated with light.

The memory 160 is a storage device constituted by a DDR-SDRAM and the like. The memory 160 includes B-side visible reflection raw image data 161, B-side reflection image data 162, B-side UV fluorescence image data 163, A-side visible reflection raw image data 164, A-side reflection image data 165, A-side UV fluorescence image data 166, and transmission image data 167.

The B-side visible reflection raw image data 161 includes reflection image data acquired by a sensor included in the upper unit 130 based on reflected light per wavelength band of an emitted light when a B-side of the banknote is irradiated with visible light by the upper unit 130. The B-side visible reflection raw image data 161 is image data that is not subjected to an arithmetic mean processing with an object of noise removal and moire prevention.

The B-side reflection image data 162 includes reflection image data acquired by a sensor included in the upper unit 130 based on reflected light per wavelength band of an emitted light when the B-side of the banknote is irradiated with the visible light and infrared light by the upper unit 130. The B-side reflection image data 162 is image data subjected to the arithmetic mean processing.

The B-side UV fluorescence image data 163 includes fluorescence image data acquired by a sensor included in the upper unit 130 based on fluorescence per wavelength band that is emitted by a banknote when the B-side of the banknote is irradiated with an ultraviolet light by the upper unit 130. The B-side UV fluorescence image data 163 is image data subjected to the arithmetic mean processing.

The A-side visible reflection raw image data 164 includes reflection image data acquired by a sensor included in the lower unit 140 based on reflected light per wavelength band of an emitted light when an A-side of the banknote is irradiated with visible light by the lower unit 140. The A-side visible reflection raw image data 164 is image data that is not subjected to the arithmetic mean processing.

The A-side reflection image data 165 includes reflection image data acquired by a sensor included in the lower unit 140 based on reflected light per wavelength band of an emitted light when the A-side of the banknote is irradiated with the visible light and infrared light by the lower unit 140. The A-side reflection image data 165 is image data subjected to the arithmetic mean processing.

The A-side UV fluorescence image data 166 includes fluorescence image data acquired by a sensor included in the lower unit 140 based on fluorescence per wavelength band that is emitted by a banknote when the A-side of the banknote is irradiated with an ultraviolet light by the lower unit 140. The A-side UV fluorescence image data 166 is image data subjected to the arithmetic mean processing.

The transmission image data 167 includes transmission image data acquired by a sensor included in the lower unit 140 based on a transmissive light that passes through the banknote per wavelength band of an emitted light when the banknote is irradiated with the light by turning on the light source included in the upper unit 130. The transmission image data 167 is image data subjected to the arithmetic mean processing.

The control unit 170 controls the entire banknote handling apparatus 100. The control unit 170 includes an image data generating unit 171, a line memory 172, a light-source control unit 173, and an AFE control unit 174.

The image data generating unit 171 temporarily stores in the line memory 172 data acquired from the line sensor 120. Several types of line data simultaneously acquired in the line sensor 120 are stored in the line memory 172. The types of the line data are distinguished based on whether it is data acquired from the A-side of the banknote or data acquired from the B-side, based on whether it is data acquired by detecting the reflected light or data acquired by detecting the transmissive light, or based on a wavelength of the emitted light, and the like. The image data generating unit 171 generates image data of each of the types by sorting the data present in the line memory 172 depending on the type of the line data. The image data generating unit 171 generates the image data by subjecting the image data of each of the types to processing such as correction and/or arithmetic mean, and registers the generated image data as one of the B-side visible reflection raw image data 161, the B-side reflection image data 162, the B-side UV fluorescence image data 163, the A-side visible reflection raw image data 164, the A-side reflection image data 165, the A-side UV fluorescence image data 166, and the transmission image data 167.

The light-source control unit 173 controls turning on/off of each of a plurality of the light sources included in the line sensor 120. The AFE control unit 174 performs offset adjustment, sampling setting of an input signal, control of a timing of storing data, data output setting, and the like with respect to a not-shown AFE 145*a* included in the line sensor 120.

Although not shown in FIG. 2, the banknote handling apparatus 100 includes a banknote receiving unit for receiving the banknote, a transporting unit for transporting the received banknote, a recognizing unit for recognizing a denomination, authenticity, fitness, and the like of the banknote based on the various image data formed from the data acquired in the line sensor 120, a storing unit for storing a banknote after it is recognized by the recognizing unit, and the like.

A configuration of the line sensor 120 of the banknote handling apparatus 100 shown in FIG. 2 is explained below. FIG. 3 is a cross-section of the line sensor 120 of the banknote handling apparatus 100 shown in FIG. 2 when the line sensor 120 is cut in a plane that is orthogonal to a transport surface of the banknote but parallel to a transport direction of the banknote.

The line sensor 120 includes the upper unit 130 on the side of the B-side of the banknote shown in the drawing, and the lower unit 140 on the side of the A-side. The upper unit 130 and the lower unit 140 are arranged across the transport path 150 along which the banknote is transported. The upper unit 130 includes a light emitting unit 131 and light emitting units 132*a* and 132*b* (together referred to as a light emitting unit 132), the condenser lens 133, the light receiving unit 134, a light receiving unit substrate 135, and a transparent member 136. The lower unit 140 includes light emitting units 142*a* and 142*b* (together referred to as a light emitting unit 142), a condenser lens 143, a light receiving unit 144, a light receiving unit substrate 145, and a transparent member 146.

A light source of each of the light emitting units 131, 132, 142 is constituted by a light guide or an LED array. The light emitting unit 132 includes a light source of infrared light 1 (IR1) of a peak wavelength 950 nm, a light source of infrared light 2 (IR2) of a peak wavelength 850 nm, a light source of far-red light (FR) of a peak wavelength 750 nm, a light source of red light (R) of a peak wavelength 650 nm, a light source of green light (G) of a peak wavelength 550 nm, a light source of purple light (V) of a peak wavelength 420 nm, and a light source of ultraviolet light (UV) of a peak wavelength 370 nm. The light emitted from the light emitting unit 132 is irradiated on the banknote after passing through the transparent member 136. The transparent member 136 is constituted by a clear glass or resin. The light reflected from the banknote is condensed by the condenser lens 133 and received by the light receiving unit 134. Data acquired by the light receiving unit 134 is sent to the control unit 170 by the light receiving unit substrate 135. The light receiving unit 134 is a line-shaped light receiving sensor and extends in a direction that is orthogonal to the paper sheet on which FIG. 3 is printed. The light receiving unit 134 includes approximately 1600 pixel units arranged linearly. Each of the pixel units includes the four light receiving elements 134*a* to 134*d*. Each of the light receiving elements 134*a* to 134*d* is provided with a bandpass filter that allows only light of a predetermined wavelength band to pass therethrough.

An ultraviolet-light cut-off filter that blocks an ultraviolet light can be arranged between the transport path 150 and the light receiving unit 134. For example, by forming an ultraviolet-light cut-off filter on the condenser lens 133 by deposition, it is possible to block the ultraviolet light component of 400 nm or less before the light reflected from the banknote reaches the light receiving unit 134. Accordingly, it is possible to block the ultraviolet light component reflected from the banknote, and a light intensity of visible light to be acquired when emitting the ultraviolet light can be limited to a light intensity of a fluorescent light. Particularly, when the light intensity of the visible fluorescent light to be acquired is low, this configuration allows the fluorescent light and a phosphorescent light to be detected with a high accuracy.

The light emitting unit 131 includes a light source of infrared light (IR) of a peak wavelength 950 nm and a light source of a green light (G) of a peak wavelength 550 nm. The light emitted from the light emitting unit 131 is irradiated on a banknote after passing through the transparent member 136. The transparent member 136 is constituted by a clear glass or resin. The light that passes through the banknote enters the condenser lens 143 after passing through the transparent member 146, which is constituted by a clear glass or resin, and the transmissive light is condensed by the condenser lens 143 and received by the light receiving unit 144. Data acquired by the light receiving unit 144 is sent to the control unit 170 by the light receiving unit substrate 145. The light receiving unit 144 is, in the same manner as the light receiving unit 134, a line-shaped light receiving sensor and extends in a direction that is orthogonal to the paper sheet on which FIG. 3 is printed. The light receiving unit 144 includes a plurality of pixel units arranged linearly. Each of the pixel units includes four light receiving elements 144a to 144d. Each of the light receiving elements 144a to 144d is provided with a bandpass filter that allows only light of a predetermined wavelength band to pass therethrough.

The light emitting unit 142 includes seven light sources of the peak wavelengths that are the same as that of the light emitting unit 132. The light emitted from the light emitting unit 142 is irradiated on the banknote after passing through the transparent member 146. The light reflected from the banknote is condensed by the condenser lens 143 and is received by the light receiving unit 144. Data acquired by the light receiving unit 144 is sent to the control unit 170 by the light receiving unit substrate 145.

The light receiving unit 134 of the upper unit 130 and the light receiving unit 144 of the lower unit 140 are relatively shifted from each other by 3 mm to 25 mm in the transport direction of the banknote. This shift has been set so that even if the light emitting unit 132 of the upper unit 130 and the light emitting unit 142 of the lower unit 140 are turned on while overlapping the lighting timings, it does not affect to the light receiving process of the opposite side. The transport path 150 is arranged between the upper unit 130 and the lower unit 140. A gap of 1 mm to 3 mm is secured between the upper unit 130 and the lower unit 140. This gap is set so that a disorder such as jamming does not occur while a banknote is transported, and a focus and an illumination depth on the optical properties can be appropriately constructed. A length in a main-scanning direction, which is orthogonal to the transport direction of the banknote shown in FIG. 3, of each of the light receiving unit 134 and the light receiving unit 144 is approximately 200 mm. Because the pixel units are approximately 1600 in number, the resolution in the main-scanning direction is about 200 dpi. The banknote is transported at a transport speed of 2000 mm/s.

A layout of the light receiving elements 134a to 134d of the light receiving unit 134 of the line sensor 120 according to the first embodiment and a correspondence thereof with the optical filters are explained below. FIGS. 4A to 4C are schematic diagrams depicting an arrangement of the light receiving elements 134a to 134d of the light receiving unit 134 of the line sensor 120 according to the first embodiment, and a correspondence thereof with the optical filters. The light receiving unit 134 is explained as an example in FIGS. 4A to 4C; however, the light receiving unit 144 has the same configuration.

As shown in FIG. 4A, the pixel unit of the light receiving unit 134 according to the first embodiment includes the four light receiving elements 134a to 134d. The pixel unit includes the light receiving element 134a provided with a bandpass filter that allows blue light (B) of a wavelength of 400 nm to 500 nm to pass therethrough, the light receiving element 134b provided with a bandpass filter that allows green light (G) of a wavelength of 500 nm to 600 nm to pass therethrough, the light receiving element 134c provided with a bandpass filter that allows red light (R) of a wavelength of 600 nm to 700 nm to pass therethrough, and the light receiving element 134d provided with a bandpass filter that allows infrared light (IR) of a wavelength of 700 nm to 1000 nm to pass therethrough. Alternatively, a filter that allows light of a wavelength of more than 1000 nm in addition to 700 nm to 1000 nm to pass therethrough can be used for the light receiving element 134d.

With this arrangement, the light receiving unit 134 can simultaneously acquire a received light intensity of the blue light (B) of the wavelength of 400 nm to 500 nm, a received light intensity of the green light (G) of the wavelength of 500 nm to 600 nm, a received light intensity of the red light (R) of the wavelength of 600 nm to 700 nm, and a received light intensity of the infrared light (IR) of the wavelength of 700 nm to 1000 nm.

In the first embodiment, as shown in FIG. 4A, the light receiving elements are arranged in two lines in the transport direction of the banknote and in two rows in a direction that is orthogonal to the transport direction; however, the present invention is not limited to this arrangement. As shown in FIG. 4B, the light receiving elements can be arranged in one row in a direction that is orthogonal to the transport direction of the banknote. Alternatively, as shown in FIG. 4C, the light receiving elements can be arranged in one line in the transport direction of the banknote.

A detailed configuration of each of the light emitting units 131, 132, 142 and the condenser lenses 133 and 143 shown in FIG. 3 is explained below by using FIGS. 5A to 5E. In FIGS. 5A to 5E, the explanation is given by showing the light emitting units 131 and 132a and the condenser lens 133 shown in FIG. 3 as example. It should be noted that the light emitting units 132b, 142a, 142b have the same configuration as the light emitting unit 132a, and the condenser lens 143 has the same configuration as the condenser lens 133.

FIG. 5A shows a detailed configuration of the light emitting unit 131 shown in FIG. 3. The light emitting unit 131 includes a light guide 12 that extends in the main-scanning direction and an LED header 11, which is a light source, arranged at each of the two ends of the light guide 12 in the main-scanning direction. A light is emitted by the LED header 11 from both ends of the light guide 12 in the directions shown by arrows in the drawing. As a result, the light guide 12 is uniformly illuminated at a wavelength of the emitted light.

FIG. 5B shows a detailed configuration of the light emitting unit 132a shown in FIG. 3. The light emitting unit 132a includes a light guide 22 and an LED header 21, which is a light source, arranged at each of the two ends of the light guide 22 in the main-scanning direction. A light is emitted by the LED header 21 from both ends of the light guide 22 in the directions shown by arrows in the drawing. As a result, in the same manner as in the light emitting unit 131, the light guide 22 is uniformly illuminated at a wavelength of the emitted light. However, the wavelength of the light emitted from the LED header 21 is different from the wavelength of the light emitted from the LED header 11. The details will be explained later.

FIG. 5O shows a detailed configuration of the condenser lens 133 shown in FIG. 3. The condenser lens 133 is a rod lens array constituted by a plurality of rod lenses 31 arranged in an array in the main-scanning direction.

In FIGS. 5A and 5B, the light emitting units 131 and 132a include the LED headers 11 and 21 at the both ends of the light guides 12 and 22, respectively. Such a configuration has been adopted with the aim of minimizing a variation in the emission intensity depending on the position in the light guides 12 and 22 by securing the emission intensity of the light guides 12 and 22 by arranging those light sources at the both ends. However, depending on the emission intensity of the LED element used in the LED headers 11 and 21 and the performance of the light guides 12 and 22, it may not be necessary to arrange the LED headers 11 and 21 at the both ends of the light guides 12 and 22, respectively.

FIG. 5D shows the light emitting unit 131 in which the LED header 11 is arranged only at one end in contrast to the light emitting unit 131 shown in FIG. 5A. FIG. 5E shows the light emitting unit 132a in which the LED header 21 is arranged only at one end in contrast to the light emitting unit 132a shown in FIG. 5B.

Figure 6A:
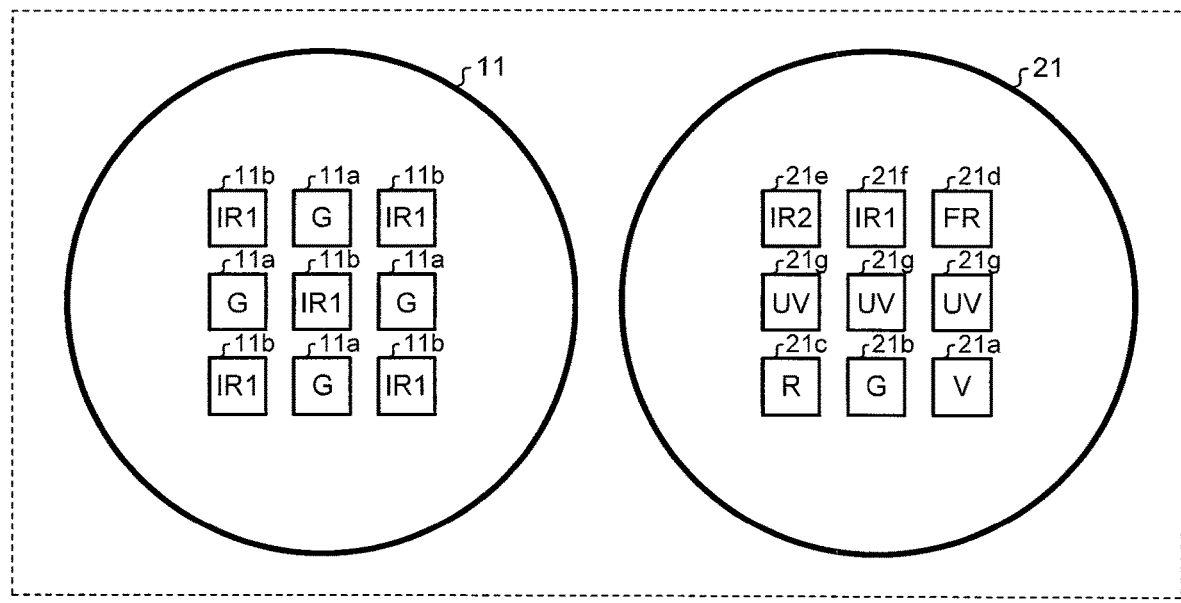
FIGS. 6A and 6B are schematic diagrams depicting an arrangement of LED elements in an LED header shown in FIGS. 5A to 5E.
Figure 6B:
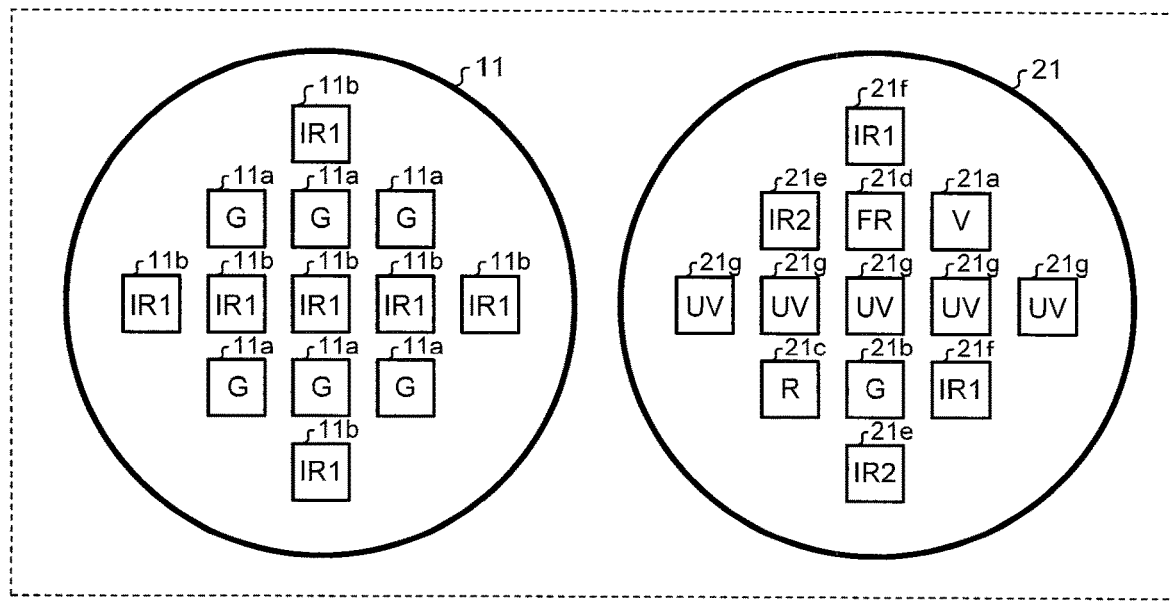

An arrangement of the LED elements in the LED headers 11 and 21 shown in FIGS. 5A to 5E is explained by using FIGS. 6A and 6B.

FIG. 6A depicts an example of an arrangement of the LED elements in the LED headers 11 and 21. In the LED header 11 shown in FIG. 6A, nine LED elements are arranged in an array of three lines and three rows. The nine LED elements include four LED elements 11a that emits a green light (G) of a peak wavelength 550 nm and five LED elements 11b that emits infrared light (IR1) of a peak wavelength 950 nm. It is ensured that a given LED element 11a that emits the green light (G) is not arranged adjacent to another LED element 11a and a given LED element 11b that emits the infrared light (IR1) is not arranged adjacent to another LED element 11b.

In the LED header 21 shown in FIG. 6A, nine LED elements are arranged in an array of three lines and three rows. The nine LED elements include one LED element 21a that emits purple light (V) of a peak wavelength 420 nm, one LED element 21b that emits green light (G) of a peak wavelength 550 nm, one LED element 21c that emits red light (R) of a peak wavelength 650 nm, one LED element 21d that emits far-red light (FR) of a peak wavelength 750 nm, one LED element 21e that emits infrared light 2 (IR2) of a peak wavelength 850 nm, one LED element 21f that emits infrared light 1 (IR1) of a peak wavelength 950 nm, and three LED elements 21g each of which emits ultraviolet light (UV) of a peak wavelength 370 nm.

The LED elements 21g that emit the ultraviolet light (UV) are provided to acquire a fluorescent emission light when the ultraviolet light is emitted. The LED elements 21g are provided in a larger number than that of the other light sources because of the fact that the light intensity of the fluorescence emission is weaker than that of the reflected light. The LED elements 21g, which emit the ultraviolet light (UV), are arranged, as shown in FIG. 6A, in the second line of the array of the three lines and three rows.

The LED elements 21g, which emit the ultraviolet light (UV), are provided with, although not shown, a visible light cut-off filter that blocks the visible light component. As a result, the visible light component of the light emitted by the LED elements 21g can be blocked, and the light intensity of the visible light which is acquired by emitting the ultraviolet light (UV) can be limited to the light intensity of the fluorescent light.

FIG. 6B depicts another example of the array of the LED elements shown in FIG. 6A. In the LED header 11 shown in FIG. 6B, thirteen LED elements are arranged in a diamond shape with one LED element in the first line, three LED elements in the second line, five LED elements in the third line, three LED elements in the fourth line, and one LED element in the fifth line. The thirteen LED elements include six LED elements 11a each of which emits a green light (G) of a peak wavelength 550 nm and seven LED elements 11b each of which emits infrared light (IR1) of a peak wavelength 950 nm. The LED elements 11a, which emit the green light (G), are arranged in the second line and the fourth line. The LED elements 11b, which emit the infrared light (IR1), are arranged in the first line, the third line, and the fifth line.

In the LED header 21 shown in FIG. 6B, thirteen LED elements are arranged in a diamond shape with one LED element in the first line, three LED elements in the second line, five LED elements in the third line, three LED elements in the fourth line, and one LED element in the fifth line. The thirteen LED elements include one LED element 21a that emits purple light (V) of a peak wavelength 420 nm, one LED element 21b that emits green light (G) of a peak wavelength 550 nm, one LED element 21c that emits red light (R) of a peak wavelength 650 nm, one LED element 21d that emits far-red light (FR) of a peak wavelength 750 nm, two LED elements 21e each of which emits infrared light 2 (IR2) of a peak wavelength 850 nm, two LED elements 21f each of which emits infrared light 1 (IR1) of a peak wavelength 950 nm, and five LED elements 21g each of which emits ultraviolet light (UV) of a peak wavelength 370 nm.

The five LED elements 21g, which emit the ultraviolet light (UV), are arranged in the third line. The LED elements 21g, which emit the ultraviolet light (UV), are provided with, although not shown, a visible light cut-off filter that blocks the visible light component.

One LED element 21e, which emits the infrared light 2 (IR2), is arranged in each of the second line and the fifth line. One LED element 21f, which emits the infrared light 1 (IR1), is arranged in each of the first line and the fourth line.

Light emitting timings of the light emitting units 131, 142, 132 and light receiving timings of the light receiving units 144 and 134 of the line sensor 120 according to the first embodiment of the line sensor 120 shown in FIG. 3 are explained below. FIG. 7 is a timing chart depicting the light emitting timings of the light emitting units 131, 142, 132 and the light receiving timings of the light receiving units 144 and 134 according to the first embodiment of the line sensor 120.

As shown in FIG. 7, the line sensor 120 acquires data corresponding to the entire surface of the banknote by repeating one cycle of 6 phases of phase 1 to 6.

In phase 1, of the light emitting unit 131, the light source that emits the infrared light (TIR) of the peak wavelength 950 nm and the light source that emits the green light (TG) of the peak wavelength 550 nm are turned on. As a result, the infrared light (TIR) and the green light (TG) are emitted on the banknote, and the light that passes through the banknote is received by the light receiving unit 144. Accordingly, a received light intensity (TIR data) of the infrared light of the wavelength of 700 nm to 1000 nm and a received light intensity (TG data) of the green light of the wavelength of 500 nm to 600 nm are acquired.

In phase 2, of each of the light emitting unit 142 and the light emitting unit 132, the light source that emits the infrared light 1 (RIR1) of the peak wavelength 950 nm, the light source that emits the red light (RR) of the peak wavelength 650 nm, the light source that emits the green light (RG) of the peak wavelength 550 nm, and the light source that emits the purple light (RV) of the peak wavelength 420 nm are turned on. As a result, the infrared light 1 (RIR1), the red light (RR), the green light (RG), and the purple light (RV) are emitted on the banknote, and the light reflected from the banknote is received by the light receiving unit 144 and the light receiving unit 134. Accordingly, a received light intensity (RIR1 data) of the infrared light of the wavelength of 700 nm to 1000 nm, a received light intensity (RR data) of the red light of the wavelength of 600 nm to 700 nm, a received light intensity (RG data) of the green light of the wavelength of 500 nm to 600 nm, and a received light intensity (RV data) of the purple light of the wavelength of 400 nm to 500 nm are acquired.

In phase 3, of each of the light emitting unit 142 and the light emitting unit 132, the light source that emits the infrared light 2 (RIR2) of the peak wavelength 850 nm is turned on. As a result, the infrared light 2 (RIR2) is emitted on the banknote, and the light reflected from the banknote is received by the light receiving unit 144 and the light receiving unit 134. Accordingly, a received light intensity (RIR2 data) of the infrared light of the wavelength of 700 nm to 1000 nm is acquired.

In phase 4, of each of the light emitting unit 142 and the light emitting unit 132, the light source that emits the far-red light (RFR) of the peak wavelength 750 nm, the light source that emits the red light (RR) of the peak wavelength 650 nm, the light source that emits the green light (RG) of the peak wavelength 550 nm, and the light source that emits the purple light (RV) of the peak wavelength 420 nm are turned on. As a result, the far-red light (RFR), the red light (RR), the green light (RG), and the purple light (RV) are emitted on the banknote, and the light reflected from the banknote is received by the light receiving unit 144 and the light receiving unit 134. Accordingly, a received light intensity (RFR data) of the infrared light of the wavelength of 700 nm to 1000 nm, a received light intensity (RR data) of the red light of the wavelength of 600 nm to 700 nm, a received light intensity (RG data) of the green light of the wavelength of 500 nm to 600 nm, and a received light intensity (RV data) of the purple light of the wavelength of 400 nm to 500 nm are acquired.

In phase 5, of each of the light emitting unit 142 and the light emitting unit 132, the light source of the ultraviolet light (RUV) of the peak wavelength 370 nm is turned on. As a result, the ultraviolet light (RUV) is emitted on the banknote, and the fluorescence from the banknote is received by the light receiving unit 144 and the light receiving unit 134. Accordingly, a received light intensity (RIR-UV data) of the infrared light of the wavelength of 700 nm to 1000 nm, a received light intensity (RR-UV data) of the red light of the wavelength of 600 nm to 700 nm, a received light intensity (RG-UV data) of the green light of the wavelength of 500 nm to 600 nm, and a received light intensity (RB-UV data) of the blue light of the wavelength of 400 nm to 500 nm are acquired.

In phase 6, of each of the light emitting unit 142 and the light emitting unit 132, the light source that emits the red light (RR) of the peak wavelength 650 nm, the light source that emits a green light (RG) of the peak wavelength 550 nm, and the light source that emits the purple light (RV) of the peak wavelength 420 nm are turned on. As a result, the red light (RR), the green light (RG), and the purple light (RV) are emitted on the banknote, and the light reflected from the banknote is received by the light receiving unit 144 and the light receiving unit 134. Accordingly, a received light intensity (RR data) of the red light of the wavelength of 600 nm to 700 nm, a received light intensity (RG data) of the green light of the wavelength of 500 nm to 600 nm, and a received light intensity (RV data) of the purple light of the wavelength of 400 nm to 500 nm are acquired.

With this operation, the data of the reflected light when the visible lights (RR, RG, RV) are emitted are acquired one time per mechanical clock, the data of the reflected light when the infrared lights (RIR1, RIR2, RFR) are emitted are acquired one time per three mechanical clocks, the data of the transmissive light when the green light (TG) and the infrared light (TIR) are emitted are acquired one time per three mechanical clocks, and the data of the fluorescence when the ultraviolet light (RUV) is emitted is acquired one time per three mechanical clocks. As a result, the image data that is formed from the reflected light when the visible lights (RR, RG, RV) are emitted has a resolution that is three times of the image data formed from the other lights.

Assuming the mechanical clock of the line sensor 120 shown in FIG. 7 to be approximately 16 kHz and the transport speed of the banknote to be 2000 mm/s, the resolution in the sub-scanning direction of the reflection image data when the visible lights (R, G, V) are emitted is about 200 dpi, and the resolution of the other image data is about one third of 200 dpi.

Figure 8:
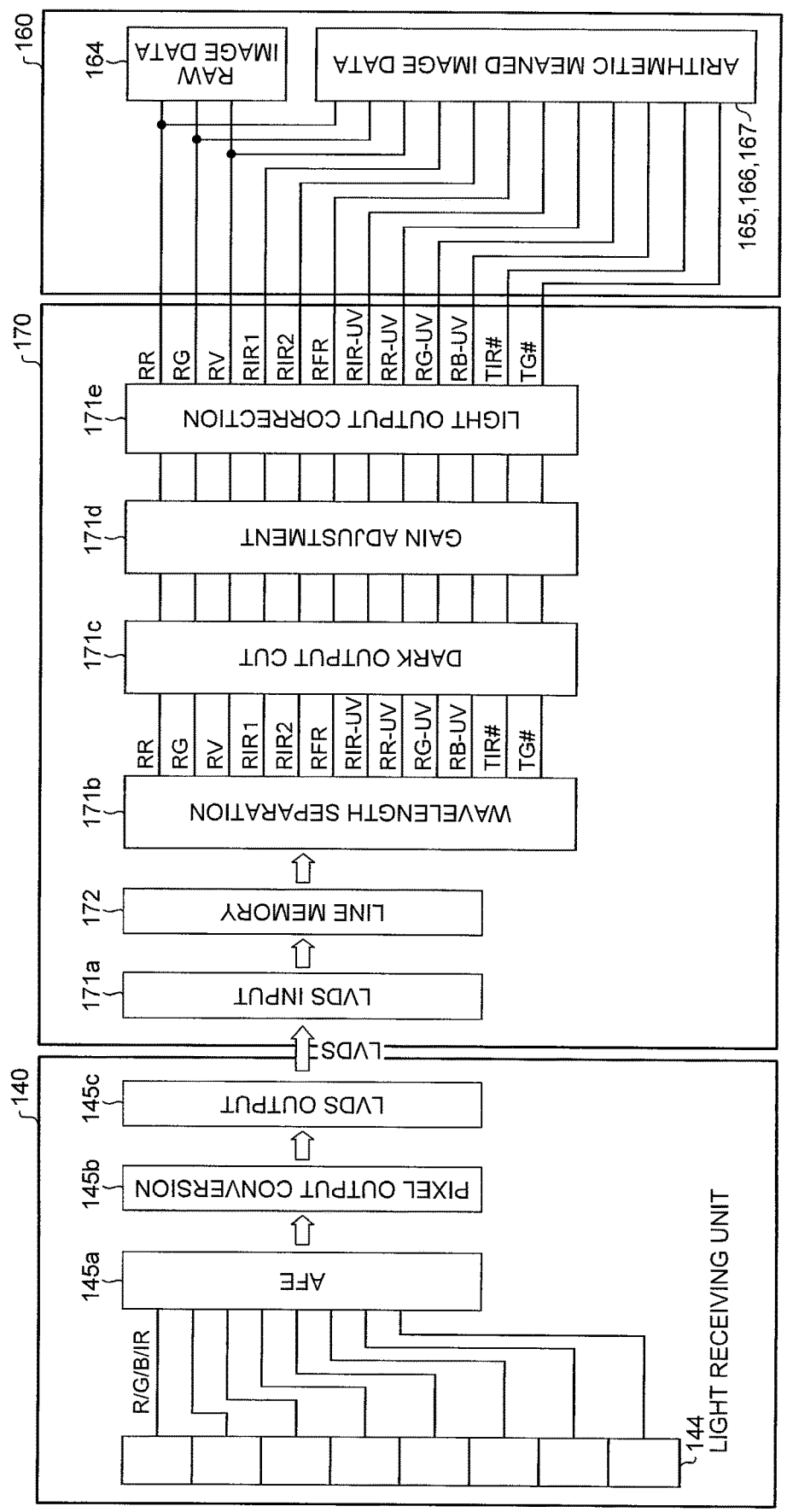
FIG. 8 is a control block diagram depicting a flow of a process procedure for forming image data based on data acquired in the line sensor shown in FIG. 3.

A flow of a process procedure for forming image data based on data acquired in the line sensor 120 shown in FIG. 3 is explained below. FIG. 8 is a control block diagram depicting a flow of a process procedure for forming the image data based on data acquired in the line sensor 120.

The data acquired with the light receiving unit 134 and the data acquired with the light receiving unit 144 of the line sensor 120 are processed mutually independently and in parallel until the image data are formed from the acquired data. FIG. 8 explains the process procedure for forming the image data by using the data acquired with the light receiving unit 144. The process procedure for processing the data acquired with the light receiving unit 134 is very similar; however, because the data of the transmissive light is not acquired with the light receiving unit 134, the processes shown with a mark "#" in FIG. 8, which are performed with respect to the transmissive light, are not performed.

The light receiving unit 144 includes approximately 1600 pixel units, and each of the pixel units shown in FIGS. 4A to 4C includes the light receiving elements 144a to 144d that receive the lights of four different wavelength bands (R, G, B, IR). The light receiving unit 144 includes eight output channels of approximately 1600 units, and the information acquired in each of the pixel units is transmitted to an AFE (Analog Front End) 145a in a predetermined order by using those eight output channels.

In the example of FIG. 8, the AFE 145a receives analog information acquired in the approximately 1600 pixel units via eight input channels connected with the output channels of the light receiving unit 144, and performs A/D conversion after subjecting the received analog information to an offset adjustment and a gain adjustment depending on the characteristics of the input channels. Moreover, the data that is acquired with the light receiving unit 144 and digitized in the A/D conversion is subjected to a pixel output conversion 145b, such as position rearrangement, to transmit the data to the control unit 170 of the main body. An LVDS output 145c is performed by sending through an LVDS serializer, and the data is transmitted to the control unit 170 of the main body by using an LVDS interface. Alternatively, an LVDS output can be performed in an AFE, and the position rearrangement can be performed in the control unit 170.

The control unit 170 temporarily stores in the line memory 172 the digitized data acquired with the light receiving unit 144 and received in an LVDS input 171a by using the LVDS interface. The data is transmitted from the lower unit 140 of the line sensor 120 each time the data is acquired by the light receiving unit 144. That is, data acquired by each of the light receiving elements 144a to 144d of the approximately 1600 pixel units are stored in the order in which the data are received by the line memory 172. The image data generating unit 171 of the control unit 170 performs wavelength separation 171b of the data stored in the line memory 172. The wavelength separation 171b includes performing separation to data according to the acquisition condition corresponding to individual data. The act of performing separation to the data according to the acquisition condition concretely includes separating into: the received light intensity data (RR) of the reflected light when the red light is emitted, the received light intensity data (RG) of the reflected light when the green light is emitted, the received light intensity data (RV) of the reflected light when the purple light is emitted, the received light intensity data (RIR1) of the reflected light when the infrared light 1 is emitted, the received light intensity data (RIR2) of the reflected light when the infrared light 2 is emitted, the received light intensity data (RFR) of the reflected light when the far-red light is emitted, the received light intensity data (RIR-UV) of the fluorescent infrared light when the ultraviolet light is emitted, the received light intensity data (RR-UV) of the fluorescent red light when the ultraviolet light is emitted, the received light intensity data (RG-UV) of the fluorescent green light when the ultraviolet light is emitted, the received light intensity data (RB-UV) of the fluorescent blue light when the ultraviolet light is emitted, the received light intensity data (TIR) of the transmissive light when the infrared light is emitted, and the received light intensity data (TG) of the transmissive light when the green light is emitted.

The image data generating unit 171 performs a dark output cut 171c, a gain adjustment 171d, and a light output correction 171e, which is correction of the light output level, based on the property of every data that has been separated according to the acquisition condition. Furthermore, the image data generating unit 171 stores, depending on an application, the raw image data, which is the reflected visible light image data based on the reflected light when the visible lights (RR, RG, RV) are emitted and which has not been subjected to any processing in particular, as the A-side visible reflection raw image data 164 in the memory 160. The image data generating unit 171 generates data of arithmetic meaned image that is divided into blocks per wavelength band for noise removal and moire prevention with respect to the reflected light image data acquired when the visible lights and the infrared lights (RR, RG, RV, RIR1, RIR2, RFR) are emitted, the fluorescence image data when the ultraviolet light (RUV) is emitted, and the transmissive light image data when the transmissive lights (TIR, TG) are emitted, and stores the generated data as the A-side reflection image data 165, the A-side UV fluorescence image data 166, and the transmission image data 167 in the memory 160.

A configuration of transmission data according to the first embodiment that is transmitted to the control unit 170 from the line sensor 120 shown in FIG. 8 that employs the LVDS interface is explained below. FIGS. 9A and 9B are schematic diagrams depicting a configuration of the transmission data according to the first embodiment that is transmitted to the control unit 170 from the line sensor 120 that employs an LVDS interface capable of transmitting 21 bits in one clock.

FIG. 9A depicts a relation between a clock and data to be transmitted when one LVDS interface is used for a clock of 132 MHz. The pixel unit of the light receiving unit 134 and the light receiving unit 144 used in the first embodiment includes the four light receiving elements 134a to 134d and 144a to 144d, respectively, as shown in FIGS. 4A to 4C. 10 bits are necessary to transmit the information acquired in one light receiving element. As a result, to transmit information acquired in four light receiving elements of one pixel unit, when the LVDS interface capable of transmitting 21 bits in one clock is used, two clocks are necessary as shown in FIG. 9A.

The example shown in FIG. 9A shows that 10 bits corresponding to the received light intensity of the red light (R) of the wavelength of 600 nm to 700 nm and 10 bits corresponding to the received light intensity of the green light (G) of the wavelength of 500 nm to 600 nm are transmitted in the first clock, and 10 bits corresponding to the received light intensity of the blue light (B) of the wavelength of 400 nm to 500 nm and 10 bits corresponding to the received light intensity of the infrared light (IR) of the wavelength of 700 nm to 1000 nm are transmitted in the second clock.

FIG. 9B depicts a relation between a clock and data to be transmitted when two LVDS interfaces are used for a clock of 66 MHz. When two LVDS interfaces capable of transmitting 21 bits in one clock are used, then the data can be transmitted in one clock as shown in FIG. 9B.

The example shown in FIG. 9B shows that 10 bits corresponding to the received light intensity of the red light (R) of the wavelength of 600 nm to 700 nm and 10 bits corresponding to the received light intensity of the green light (G) of the wavelength of 500 nm to 600 nm are transmitted with the first LVDS interface, and 10 bits corresponding to the received light intensity of the blue light (B) of the wavelength of 400 nm to 500 nm and 10 bits corresponding to the received light intensity of the infrared light (IR) of the wavelength of 700 nm to 1000 nm are transmitted with the second LVDS interface.

As explained above, in the first embodiment, the light sources include the visible-light light sources one each for outputting a predetermined light intensity in each of the wavelength bands obtained by dividing the wavelength band of the visible light into three, and the three infrared-light light sources one each for outputting a predetermined light intensity in each of the wavelength bands obtained by dividing the wavelength band of the infrared light into three. Moreover, the first embodiment includes the three light receiving elements each covered with the bandpass filter that corresponds to each of the three wavelength bands obtained by dividing the wavelength band of the visible light into three and one light receiving element covered with the bandpass filter that corresponds to the one wavelength band obtained by bundling the three wavelength bands of the infrared light. Furthermore, the image data of each of the three wavelength bands that were obtained by dividing the wavelength band of the visible light into three when emitting the visible light is generated based on the data acquired in the three light receiving elements each of which is covered with the bandpass filter corresponding to the wavelength band obtained by dividing the wavelength band of the visible light into three when the visible-light light sources are turned on. Moreover, the image data of each of the three wavelength bands that were obtained by dividing the wavelength band of the infrared light into three when emitting the infrared light is generated based on the data acquired in the light receiving element covered with the bandpass filter corresponding to the infrared light that is emitted by turning on one by one the red-light light sources per wavelength band obtained by dividing the wavelength band of the infrared light into three. Accordingly, when forming the images of the plurality of the visible lights and the infrared lights of the different wavelength bands, degradation in resolution and accuracy of each of the image can be prevented efficiently.

Second Embodiment

In the first embodiment, an example has been explained in which the reflection image data when the visible lights are emitted are formed at a high resolution, and other data, such as the reflection image data when the infrared light is emitted, the reflection image data when the far-red light is emitted, the fluorescence image data when the ultraviolet light is emitted, and the transmission image data when the visible lights are emitted are formed at one-third resolution of the reflection image data when the visible lights are emitted. However, depending on the application of the image data, there may be a need for a higher resolution for the image data of even other than the reflection image data when the visible lights are emitted. Therefore, in the second embodiment, an example is explained in which it is possible to form image data at a high resolution for the image data of even other than the reflection image data when the visible lights are emitted while securing high-speed performance.

Figure 10:
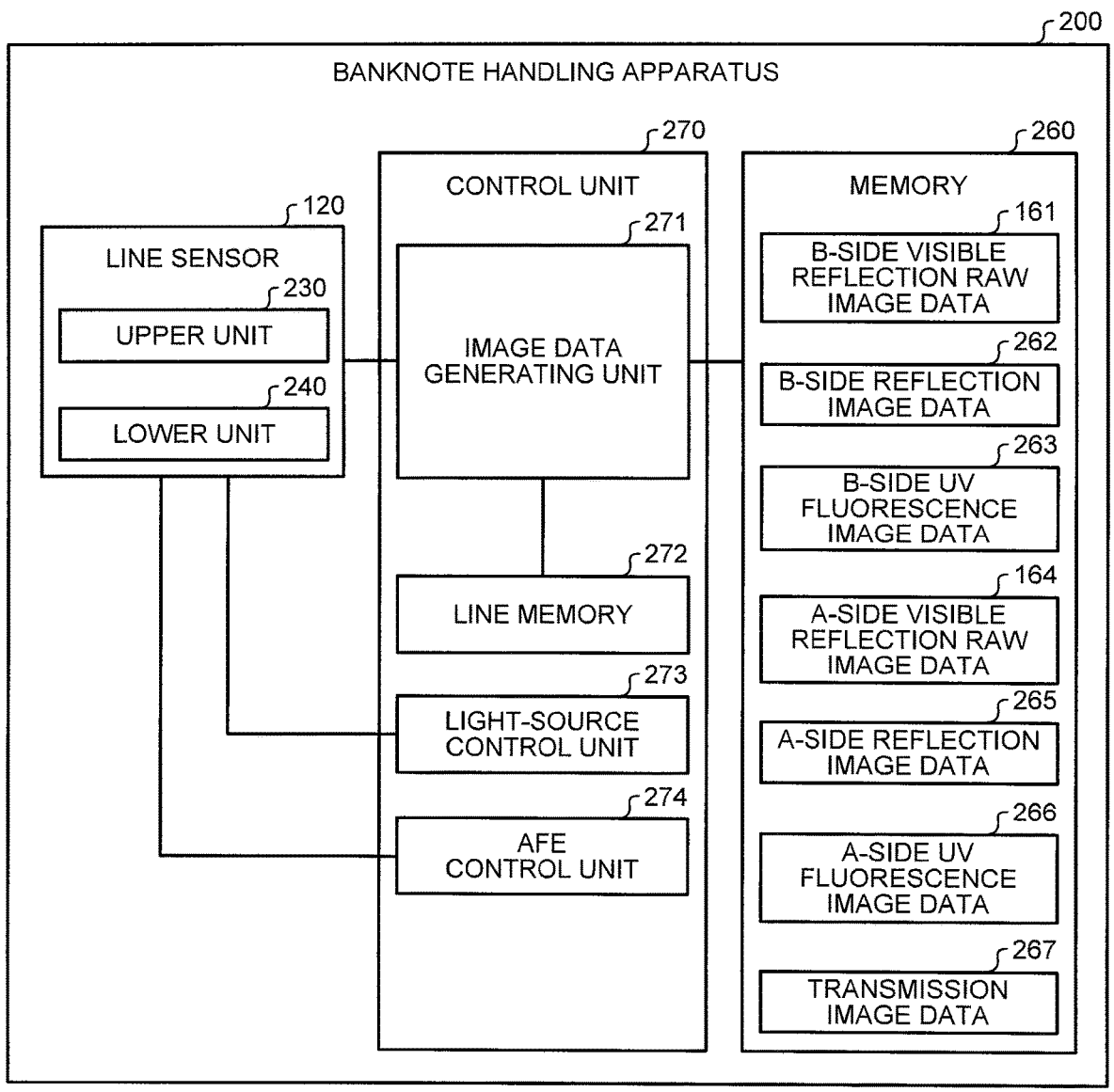
FIG. 10 is a block diagram of an internal configuration of a banknote handling apparatus according to a second embodiment.

An internal configuration of a banknote handling apparatus 200 according to the second embodiment is explained below. FIG. 10 is a block diagram of the internal configuration of the banknote handling apparatus 200 according to the second embodiment. In FIG. 10, the same reference numbers are given to the structural components that are the same as those of the banknote handling apparatus 100 of the first embodiment, an explanation of the structural components that are the same as those of the banknote handling apparatus 100 of the first embodiment will be omitted, and an explaining will be given mainly of the structural components that are different from those of the banknote handling apparatus 100.

In the line sensor 120, an upper unit 230 and a lower unit 240 are different from the upper unit 130 and the lower unit 140, respectively, according to the first embodiment. Specifically, in the first embodiment, the four light receiving elements of each of the pixel units include the bandpass filters that respectively pass the lights of different wavelength bands; however, in the second embodiment, each of the pixel units includes six light receiving elements and bandpass filters that respectively pass the lights of different wavelength bands. Although the details will be explained later, the infrared wavelength band is corresponded to one light receiving element in the first embodiment; however, the infrared wavelength band is divided into three wavelength bands and three light receiving elements each having a bandpass filter corresponding to each of the three wavelength bands are arranged in the second embodiment.

B-side reflection image data 262, B-side UV fluorescence image data 263, A-side reflection image data 265, A-side UV fluorescence image data 266, and transmission image data 267 stored in a memory 260 are different from the B-side reflection image data 162, the B-side UV fluorescence image data 163, the A-side reflection image data 165, the A-side UV fluorescence image data 166, and the transmission image data 167, respectively, according to the first embodiment.

The type of the image data included in the B-side reflection image data 262 is the same as the type of the image data included in the B-side reflection image data 162 according to the first embodiment. However, the resolution in the sub-scanning direction of each of reflection image data when the B-side infrared light 1 (IR1) is emitted, reflection image data when the B-side infrared light 2 (IR2) is emitted, and reflection image data when the B-side far-red light (FR) is emitted according to the second embodiment is three times of the same according to the first embodiment.

With regard to the type of the image data included in the B-side UV fluorescence image data 263, when compared with the type of the image data included in the B-side UV fluorescence image data 163 according to the first embodiment, because the infrared bandpass filters are three in number, infrared (IR) emission image data when the B-side ultraviolet light (UV) is emitted included in the B-side UV fluorescence image data 163 according to the first embodiment is changed to three image data corresponding to the three infrared wavelength bands when the B-side ultraviolet light (UV) is emitted. The resolution in the sub-scanning direction of each of red (R) emission image data when the B-side ultraviolet light (UV) is emitted, green (G) emission image data when the B-side ultraviolet light (UV) is emitted, and blue (B) emission image data when the B-side ultraviolet light (UV) is emitted included in the B-side UV fluorescence image data 163 which is also indicated in the first embodiment is 1.5 times of the same according to the first embodiment.

The type of the image data included in the A-side reflection image data 265 is the same as the type of the image data included in the A-side reflection image data 165 according to the first embodiment. However, the resolution in the sub-scanning direction of each of reflection image data when the A-side infrared light 1 (IR1) is emitted, reflection image data when the A-side infrared light 2 (IR2) is emitted, and reflection image data when the A-side far-red light (FR) is emitted according to the second embodiment is three times of the same according to the first embodiment.

With regard to the type of the image data included in the A-side UV fluorescence image data 266, when compared with the type of the image data included in the A-side UV fluorescence image data 166 according to the first embodiment, because the infrared bandpass filters are three in number, the infrared (IR) emission image data when the A-side ultraviolet light (UV) is emitted included in the A-side UV fluorescence image data 166 according to the first embodiment is changed to three image data corresponding to the three infrared wavelength bands when the A-side ultraviolet light (UV) is emitted. The resolution in the sub-scanning direction of each of the red (R) emission image data when the A-side ultraviolet light (UV) is emitted, the green (G) emission image data when the A-side ultraviolet light (UV) is emitted, and the blue (B) emission image data when the A-side ultraviolet light (UV) is emitted included in the A-side UV fluorescence image data 166 which is also indicated in the first embodiment is 1.5 times of the same according to the first embodiment.

The type of the image data included in the transmission image data 267 is the same in both the embodiments. However, the resolution in the sub-scanning direction of each of the transmission image data when the infrared light (IR) is emitted and the transmission image data when the green light (G) is emitted according to the second embodiment is 1.5 times of the same according to the first embodiment.

An image data generating unit 271 of a control unit 270 has a configuration that is different from that of the image data generating unit 171 according to the first embodiment. The logical contents of the processing performed by the image data generating unit 271 according to both the embodiments are similar; however, because the configurations of light receiving units 234 and 244 have changed, the data transmitted from the line sensor 120 is different because of a difference in the frequency of data acquisition and the type of acquired data, and, therefore, the process to form the image data is also different because of these differences. The role of a line memory 272 as a region for buffering the data is the same as that according to the first embodiment; however, the type of data to be buffered and the necessary capacity are different.

In a light-source control unit 273, the configuration of a light source is similar to that of the light source of the line sensor 120; however, because the configurations of the light receiving elements of the pixel units have changed, the content of the control of timing of turning on/off of each of the light sources is different from the same in the light-source control unit 173 according to the first embodiment. Specifically, although the details will be explained later, the number of the light receiving elements in each of the pixel units is four in the first embodiment and the infrared wavelength band is corresponded to one of the light receiving elements; however, because the number of the light receiving elements in each of the pixel units is six and three light receiving elements each having a bandpass filter corresponding to each of the three infrared wavelength bands are arranged in the second embodiment, a received light intensity of each of the three infrared wavelength bands can be acquired by simultaneously emitting the light of the three infrared wavelength bands.

With respect to an AFE control unit 274 as well, because of the change in the configuration of the pixel units of the line sensor 120 and the light emitting timing of the light sources of the light-source control unit 273, the contents of the processing such as the offset adjustment, the sampling setting of an input signal, the control of a timing of storing data, and the data output setting, are different from that of the AFE control unit 174 according to the first embodiment.

Arrangements of light receiving elements 234a to 234f of the light receiving unit 234 of the line sensor 120 according to the second embodiment and a correspondence thereof with optical filters are explained below. FIGS. 11A to 11D are schematic diagrams depicting arrangements of the light receiving elements 234a to 234f of the light receiving unit 234 of the line sensor 120 according to the second embodiment, and a correspondence thereof with the optical filters. In FIGS. 11A to 11D, the explanation is given by taking an example of the light receiving unit 234 of the upper unit 230; however, the light receiving unit 244 of the lower unit 240 has the same configuration.

Figure 11A:
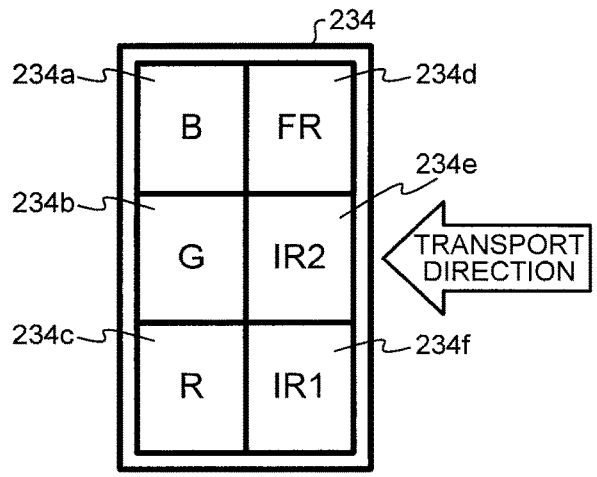
FIGS. 11A to 11D are schematic diagrams depicting arrangements of light receiving elements of a light receiving unit of a line sensor according to the second embodiment, and a correspondence thereof with optical filters.

As shown in FIG. 11A, the pixel unit of the light receiving unit 234 according to the second embodiment includes six light receiving elements 234a to 234f. The pixel unit includes the light receiving element 234a provided with a bandpass filter that allows blue light (B) of the wavelength of 400 nm to 500 nm to pass therethrough, the light receiving element 234b provided with a bandpass filter that allows green light (G) of the wavelength of 500 nm to 600 nm to pass therethrough, the light receiving element 234c provided with a bandpass filter that allows red light (R) of the wavelength of 600 nm to 700 nm to pass therethrough, the light receiving element 234d provided with a bandpass filter that allows far-red light (FR) of the wavelength of 700 nm to 800 nm to pass therethrough, the light receiving element 234e provided with a bandpass filter that allows infrared light 1 (IR2) of the wavelength of 800 nm to 900 nm to pass therethrough, and the light receiving element 234f provided with a bandpass filter that allows infrared light 2 (IR1) of the wavelength of 900 nm to 1000 nm to pass therethrough.

With this arrangement, the light receiving unit 234 can simultaneously acquire a received light intensity of the blue light (B) of the wavelength of 400 nm to 500 nm, a received light intensity of the green light (G) of the wavelength of 500 nm to 600 nm, a received light intensity of the red light (R) of the wavelength of 600 nm to 700 nm, a received light intensity of the far-red light (FR) of the wavelength of 700 nm to 800 nm, a received light intensity of the infrared light 1 (IR2) of the wavelength of 800 nm to 900 nm, and a received light intensity of the infrared light 2 (IR1) of the wavelength of 900 nm to 1000 nm.

Figure 11B:
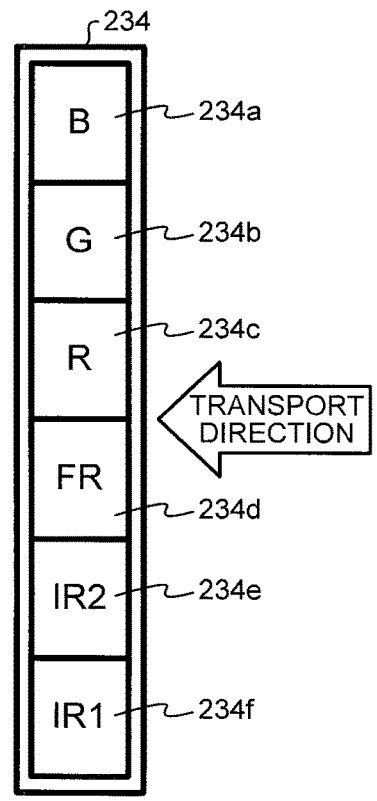
Figure 11C:
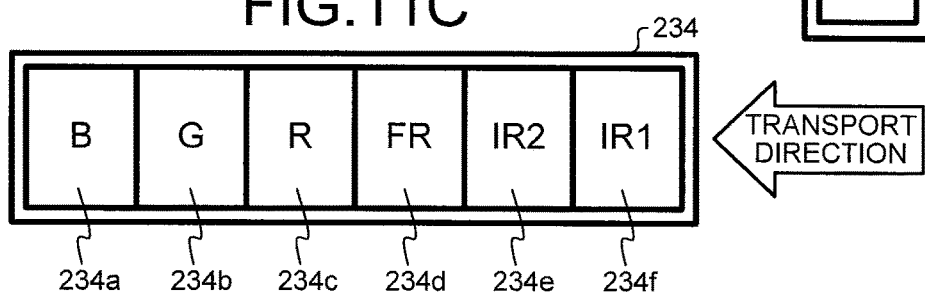
Figure 11D:
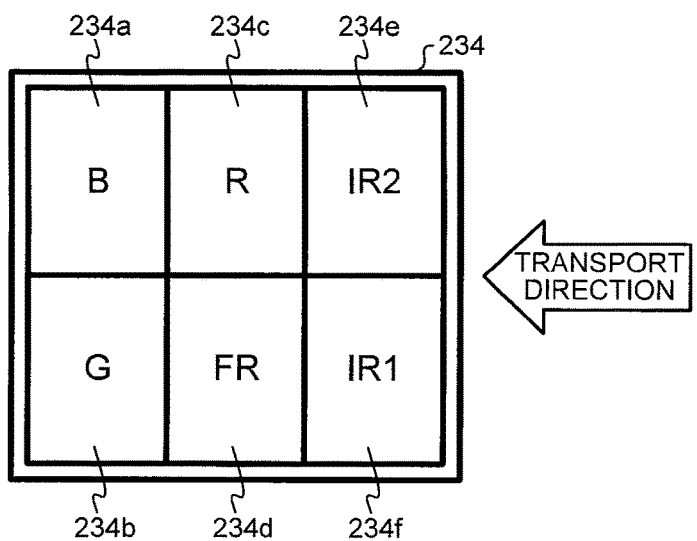

In the second embodiment, as shown in FIG. 11A, the light receiving elements are arranged in three lines in the transport direction of the banknote and in two rows in a direction that is orthogonal to the transport direction; however, the present invention is not limited to this arrangement. As shown in FIG. 11B, the light receiving elements can be arranged in one row in a direction that is orthogonal to the transport direction of the banknote. Alternatively, as shown in FIG. 11C, the light receiving elements can be arranged in one line in the transport direction of the banknote. Alternatively, as shown in FIG. 11D, the light receiving elements can be arranged in two lines in the transport direction of the banknote and in three rows in the direction that is orthogonal to the transport direction.

Figure 12:
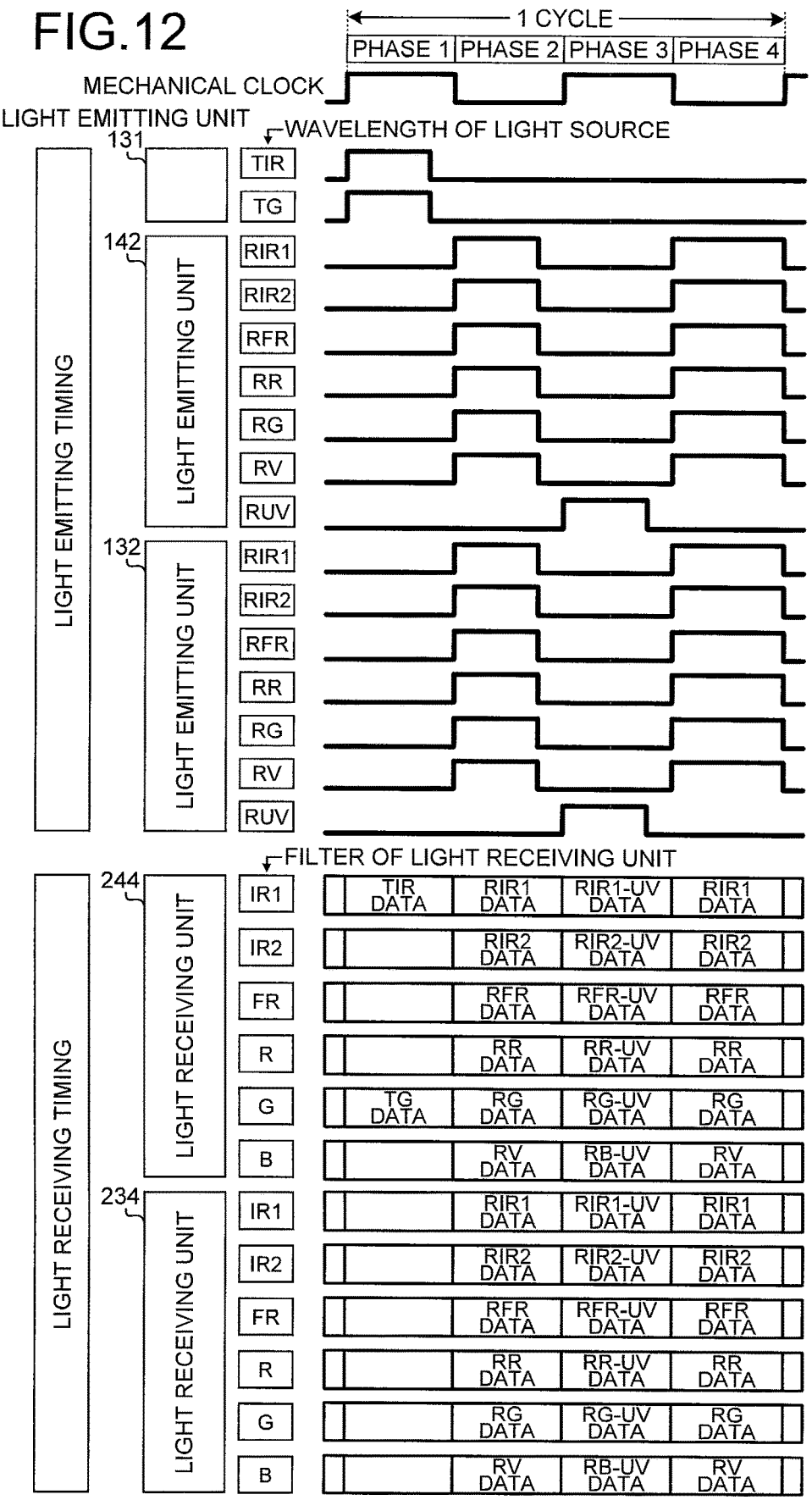
FIG. 12 is a timing chart depicting light emitting timings of light emitting units and light receiving timings of the light receiving units according to the second embodiment of the line sensor.

Light emitting timings of the light emitting units 131, 142, and 132 and light receiving timings of the light receiving units 244 and 234 according to the second embodiment of the line sensor 120 are explained below. FIG. 12 is a timing chart depicting the light emitting timings of the light emitting units 131, 142, and 132 and the light receiving timings of the light receiving units 244 and 234 according to the second embodiment of the line sensor 120.

As shown in FIG. 12, the line sensor 120 acquires data corresponding to the entire surface of a banknote by repeating one cycle of 4 phases of phase 1 to 4.

In phase 1, of the light emitting unit 131, the light source that emits the infrared light (TIR) of the peak wavelength 950 nm and the light source that emits the green light (TG) of the peak wavelength 550 nm are turned on. As a result, the infrared light (TIR) and the green light (TG) are emitted on the banknote, and the light that passes through the banknote is received by the light receiving unit 244. Accordingly, a received light intensity (TIR data) of the infrared light 1 of the wavelength of 900 nm to 1000 nm and a received light intensity (TG data) of the green light of the wavelength of 500 nm to 600 nm are acquired.

The phase 2 and the phase 4 have the same contents in which, of each of the light emitting unit 142 and the light emitting unit 132, the light source that emits the infrared light 1 (RIR1) of the peak wavelength 950 nm, the light source that emits the infrared light 2 (RIR2) of the peak wavelength 850 nm, the light source that emits the far-red light (RFR) of the peak wavelength 750 nm, the light source that emits the red light (RR) of the peak wavelength 650 nm, the light source that emits the green light (RG) of the peak wavelength 550 nm, and the light source that emits the purple light (RV) of the peak wavelength 420 nm are turned on. As a result, the infrared light 1 (RIR1), the infrared light 2 (RIR2), the far-red light (RFR), the red light (RR), the green light (RG), and the purple light (RV) are emitted on the banknote, the light reflected from the banknote is received by the light receiving unit 244 and the light receiving unit 234. Accordingly, a received light intensity (RIR1 data) of the infrared light 1 of the wavelength of 900 nm to 1000 nm, a received light intensity (RIR2 data) of the infrared light 2 of the wavelength of 800 nm to 900 nm, a received light intensity (RFR data) of the far-red light of the wavelength of 700 nm to 800 nm, a received light intensity (RR data) of the red light of the wavelength of 600 nm to 700 nm, a received light intensity (RG data) of the green light of the wavelength of 500 nm to 600 nm, and a received light intensity (RV data) of the purple light of the wavelength of 400 nm to 500 nm are acquired.

In the phase 3, of each of the light emitting unit 142 and the light emitting unit 132, the light source that emits the ultraviolet light (RUV) of the peak wavelength 370 nm is turned on. As a result, the ultraviolet light (RUV) is emitted on the banknote, and the light reflected from the banknote is received by the light receiving unit 244 and the light receiving unit 234. Accordingly, a received light intensity (RIR1-UV data) of the infrared light 1 of the wavelength of 900 nm to 1000 nm, a received light intensity (RIR2-UV data) of the infrared light 2 of the wavelength of 800 nm to 900 nm, a received light intensity (RFR-UV data) of the far-red light of the wavelength of 700 nm to 800 nm, a received light intensity (RR-UV data) of the red light of the wavelength of 600 nm to 700 nm, a received light intensity (RG-UV data) of the green light of the wavelength of 500 nm to 600 nm, and a received light intensity (RB-UV data) of the blue light of the wavelength of 400 nm to 500 nm are acquired.

With this operation, the data of the reflected light when the infrared lights (IR1, IR2), the far-red light (FR), and the visible lights (R, G, V) are emitted are acquired one time per mechanical clock, the data of the transmissive light when the green light (G) and the infrared light (IR) are emitted are acquired one time per two mechanical clocks, and the data of the fluorescence when the ultraviolet light (UV) is emitted is acquired one time per two mechanical clocks. As a result, the image data that are formed from the reflected light when the infrared lights (IR1, IR2), the far-red light (FR), and the visible lights (R, G, V) are emitted have a resolution that is two times of the image data formed from the other lights.

Assuming the mechanical clock of the line sensor 120 shown in FIG. 12 to be approximately 16 kHz and the transport speed of the banknote to be 2000 mm/s, the resolution in the sub-scanning direction of the reflection image data when the infrared lights (IR1, IR2), the far-red light (FR), and the visible lights (R, G, V) are emitted is about 200 dpi, and the resolution of the other image data is 100 dpi. Thus, when compared with the first embodiment, the resolution of the image data formed based on the reflected light of the infrared lights (IR1, IR2) and the far-red light (FR) is three times, and the resolution of each of the image data formed based on the transmissive light when the green light (G) and the infrared light (IR) are emitted and the image data formed based on the fluorescence when the ultraviolet light (UV) is emitted are 1.5 times.

Figure 13:
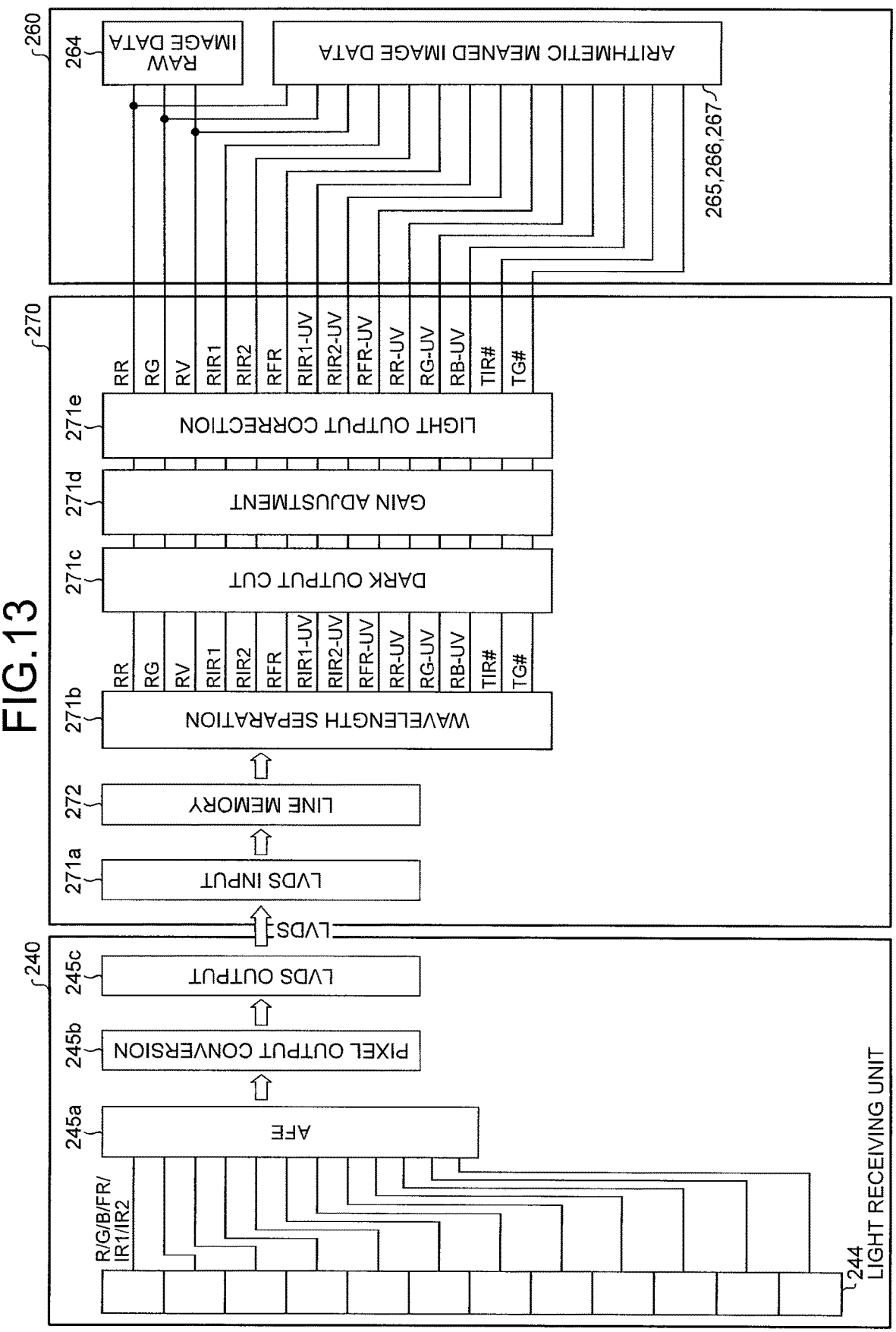
FIG. 13 is a control block diagram depicting a flow of a process procedure for forming image data based on data acquired in the line sensor according to the second embodiment.

A flow of a process procedure for forming image data based on data acquired in the line sensor 120 according to the second embodiment is explained below. FIG. 13 is a control block diagram depicting a flow of a process procedure for forming the image data based on data acquired in the line sensor 120 according to the second embodiment. Referring to FIG. 13, only those processes that are different from those shown in the control block diagram according to the first embodiment shown in FIG. 8 are mainly explained here.

The data acquired with the light receiving unit 234 of the line sensor 120 and the data acquired with the light receiving unit 244 are processed mutually independently and in parallel until the image data are formed from the acquired data. FIG. 13 explains the process procedure for forming the image data by using the data acquired with the light receiving unit 244. The process procedure for processing the data acquired with the light receiving unit 234 is very similar; however, because the data of the transmissive light is not acquired with the light receiving unit 234, the processes shown with a mark "#" in FIG. 13, which are performed on the transmissive light, are not performed.

The light receiving unit 244 includes approximately 1600 pixel units, and each of the pixel units shown in FIGS. 11A to 11D includes the light receiving elements 244a to 244f that receive the lights of six different wavelength bands (R, G, B, FR, IR1, IR2). The light receiving unit 244 includes 12 output channels, and information acquired in approximately 1600 units of the pixel units is transmitted to an AFE (Analog Front End) 245a in a predetermined order by using those 12 output channels.

With regard to the process after the information is transmitted to the AFE 245a and before the information is stored in the line memory 272 of the control unit 270, the logical contents of the processing performed in the AFE 245a, a pixel output conversion 245b, an LVDS output 245c, and an LVDS input 271a are not changed except that the types of data have increased because of the increase in the number of light receiving elements included in the pixel unit and the data acquisition frequency has increased depending on the type of data. The AFE 245a built-in an LVDS output is available, and the position rearrangement can be performed in the control unit 270.

The image data generating unit 271 of the control unit 270 performs wavelength separation 271b of the data stored in the line memory 272. The wavelength separation 271b includes performing separation of the data according to the acquisition condition corresponding to individual data. The act of performing separation of the data according to the acquisition condition concretely includes separating into: the received light intensity data (RR) of the reflected light when the red light is emitted, the received light intensity data (RG) of the reflected light when the green light is emitted, the received light intensity data (RV) of the reflected light when the purple light is emitted, the received light intensity data (RIR1) of the reflected light when the infrared light 1 is emitted, the received light intensity data (RIR2) of the reflected light when the infrared light 2 is emitted, the received light intensity data (RFR) of the reflected light when the far-red light is emitted, the received light intensity data (RIR1-UV) of the fluorescent infrared light 1 when the ultraviolet light is emitted, the received light intensity data (RIR2-UV) of the fluorescent infrared light 2 when the ultraviolet light is emitted, the received light intensity data (RFR-UV) of the fluorescent far-red light when the ultraviolet light is emitted, the received light intensity data (RR-UV) of the fluorescent red light when the ultraviolet light is emitted, the received light intensity data (RG-UV) of the fluorescent green light when the ultraviolet light is emitted, the received light intensity data (RB-UV) of the fluorescent blue light when the ultraviolet light is emitted, the received light intensity data (TIR) of the transmissive light when the infrared light is emitted, and the received light intensity data (TG) of the transmissive light when the green light is emitted. When compared with the first embodiment, in the second embodiment, the light receiving unit 244 can acquire each of the three wavelength bands of the infrared light. Therefore, the received light intensity data (RIR-UV) of the fluorescent infrared light when the ultraviolet light is emitted is changed to the received light intensity data (RIR1-UV) of the fluorescent infrared light 1 when the ultraviolet light is emitted, the received light intensity data (RIR2-UV) of the fluorescent infrared light 2 when the ultraviolet light is emitted, the received light intensity data (RFR-UV) of the fluorescent far-red light when the ultraviolet light is emitted.

The logical contents of the act of performing a dark output cut 271c, a gain adjustment 271d, and a light output correction 271e on the data that has been separated and obtained according to the acquisition condition are the same as those performed in the first embodiment except that the types of the data have increased and the resolution has increased depending on the type of data. Moreover, the logical contents of the acts of generating A-side visible reflection raw image data 164 as raw image data based on the reflected light when the visible lights (RR, RG, RV) are emitted from the data corrected by performing the dark output cut 271*c*, the gain adjustment 271*d*, and the light output correction 271*e*, and generating data of arithmetic meaned image that is divided into blocks per wavelength band and storing the A-side reflection image data 265, the A-side UV fluorescence image data 266, and the transmission image data 267 in the memory 260 are the same as those performed in the first embodiment except that the types of the data have increased and the resolution has increased depending on the type of data.

A configuration of transmission data according to the second embodiment that is transmitted to the control unit 270 from the line sensor 120 shown in FIG. 13 that employs an LVDS interface is explained below. FIGS. 14A and 14B are schematic diagrams depicting a configuration of the transmission data according to the second embodiment that is transmitted to the control unit 270 from the line sensor 120 that employs an LVDS interface capable of transmitting 35 bits in one clock.

FIG. 14A depicts a relation between a clock and data to be transmitted when one LVDS interface is used for a clock of 132 MHz. The pixel unit of the light receiving unit 234 and the light receiving unit 244 used in the second embodiment includes the six light receiving elements 234*a* to 234*f* and 244*a* to 244*f*, respectively, as shown in FIGS. 11A to 11D. 10 bits are necessary to transmit the information acquired in one light receiving element. As a result, to transmit information acquired in six light receiving elements of one pixel unit, when the LVDS interface capable of transmitting 35 bits in one clock is used, two clocks are necessary as shown in FIG. 14A.

The example shown in FIG. 14A shows that 10 bits corresponding to the received light intensity of the red light (R) of the wavelength of 600 nm to 700 nm, 10 bits corresponding to the received light intensity of the green light (G) of the wavelength of 500 nm to 600 nm, and 10 bits corresponding to the received light intensity of the blue light (B) of the wavelength of 400 nm to 500 nm are transmitted in the first clock, and 10 bits corresponding to the received light intensity of the far-red light (FIR) of the wavelength of 700 nm to 800 nm, 10 bits corresponding to the received light intensity of the infrared light 1 (IR1) of the wavelength of 900 nm to 1000 nm, and 10 bits corresponding to the received light intensity of the infrared light 2 (IR2) of the wavelength of 800 nm to 900 nm are transmitted in the second clock.

FIG. 14B depicts a relation between a clock and data to be transmitted when two LVDS interfaces are used for a clock of 66 MHz. When two LVDS interfaces capable of transmitting 35 bits in one clock are used, then the data can be transmitted in one clock as shown in FIG. 14B.

The example shown in FIG. 14B shows that 10 bits corresponding to the received light intensity of the red light (R) of the wavelength of 600 nm to 700 nm, 10 bits corresponding to the received light intensity of the green light (G) of the wavelength of 500 nm to 600 nm, and 10 bits corresponding to the received light intensity of the blue light (B) of the wavelength of 400 nm to 500 nm are transmitted with the first LVDS interface, and 10 bits corresponding to the received light intensity of the far-red light (FIR) of the wavelength of 700 nm to 800 nm, 10 bits corresponding to the received light intensity of the infrared light 1 (IR1) of the wavelength of 900 nm to 1000 nm, and 10 bits corresponding to the received light intensity of the infrared light 2 (IR2) of the wavelength of 800 nm to 900 nm are transmitted with the second LVDS interface.

As explained above, in the second embodiment, the light sources include the visible-light light sources one each for outputting a predetermined light intensity in each of the wavelength bands obtained by dividing the wavelength band of the visible light into three, and the three infrared-light light sources one each for outputting a predetermined light intensity in each of the wavelength bands obtained by dividing the wavelength band of the infrared light into three. Moreover, the second embodiment includes the six light receiving elements each of which is covered with the bandpass filter that corresponds to each of the three wavelength bands obtained by dividing the wavelength band of the visible light into three and each of the three wavelength bands obtained by dividing the wavelength band of the infrared light into three. Moreover, the visible-light light sources and the infrared-light light sources are turned on while overlapping the lighting timings thereof, and the image data of each of the three wavelength bands that are obtained by dividing the wavelength band of the visible light into three when emitting the visible lights are formed based on the data acquired in the three light receiving elements each of which is covered with the bandpass filter that corresponds to each of the three wavelength bands obtained by dividing the wavelength band of the visible light into three, and the image data of each of the three wavelength bands that are obtained by dividing the wavelength band of the infrared light into three when emitting the infrared light are formed based on the data acquired in the three light receiving elements each of which is covered with the bandpass filter that corresponds to each of the three wavelength bands obtained by dividing the infrared light into three. Accordingly, when forming the images of the plurality of the visible lights and the infrared lights of the different wavelength bands, degradation in resolution and accuracy of each of the image can be prevented efficiently. Moreover, in comparison with the first embodiment, the six light receiving elements are provided in the pixel unit to allow division of the infrared light. Therefore, the resolution of the image data of each of the wavelength bands of the infrared light can be increased further.

In the first embodiment and the second embodiment, the banknote handling apparatuses 100 and 200 that handle a banknote are explained; however, the present invention is not limited to a device that handles a banknote. For example, a similar sensor module can be employed in a device that forms an image of a valuable medium such as a check and a gift certificate.

The first embodiment and the second embodiment are explained with an assumption that the mechanical clock of the line sensor 120 is 16 kHz, the transport speed of the banknote is 2000 mm/s, and the clock of the LVDS interface is 66 MHz or 132 MHz; however, the present invention is not limited to this configuration. The transport speed can be increased further, and to obtain an image of the resolution of the same level, and the mechanical clock of the line sensor 120 and the clock of the LVDS interface can be increased in proportion to the transport speed. Moreover, instead of increasing the clocks of the LVDS interface, more LVDS interfaces can be used in parallel.

In the first embodiment and the second embodiment, it is explained that the light emitting unit corresponding to each of the visible lights and the infrared lights includes a plurality of light sources that emit light having a peak wavelength within each of the wavelength bands obtained by dividing into a plurality of wavelength bands; however, the present invention is not limited to this configuration. It is sufficient that light having a predetermined intensity in each of the divided plurality of wavelength bands is emitted, so that it is not necessary to provide one light source for each of the divided wavelength bands. For example, a single white light source that can emit light having the predetermined intensity in each of the divided plurality of wavelength bands can be used.

In the first embodiment and the second embodiment, as shown in FIGS. 7 and 12, it is explained to form the reflected light image data, the transmissive light image data, and the fluorescent light image data based on the data acquired while the light emitting units are emitting the lights; however, the present invention is not limited to this configuration. For example, to detect the afterglow (phosphorescence) after the irradiation of the excitation light is stopped by emitting an excitation light of a wavelength of a predetermined band on the banknote, it is allowable to arrange a time slot in which the light emitting unit is turned off, and control the line sensor 120 to acquire the phosphorescence of the banknote while the light emitting unit is off and form image data of the phosphorescence based on the information of the acquired phosphorescence intensity.

For example, FIG. 15 depicts a cross-section of a line sensor 120 that is different from the line sensor 120 shown in FIG. 3. In the line sensor 120 shown in FIG. 15, the upper unit and the lower unit have the same dimension in the transport direction and the edges of these units are aligned. This structure allows downsizing.

The various structural components mentioned in the above embodiments are functional and are not necessarily present physically. That is, decentralization and/or unification of various components are not limited to that shown in the drawings. All of or some of the components can be decentralized and/or unified in desired units, functionally or physically, depending on various load, operating conditions, and the like.

INDUSTRIAL APPLICABILITY

As explained above, the light receiving sensor, the sensor module, and the paper sheet handling apparatus according to the present invention are suitable for, when forming the images of the plurality of the visible lights and the infrared lights of the different wavelength bands, efficiently preventing degradation in resolution and accuracy of each of the image.

EXPLANATION OF REFERENCE NUMERALS 11, 21 LED header
11a, 11b, 21a, 21b, 21c, 21d, 21e, 21f, 21g LED element
12, 22 Light guide Rod lens
100, 200 Banknote handling apparatus
120 Line sensor
130, 230 Upper unit
131, 132, 132a, 132b, 137, 142, 142a, 142b Light emitting unit
133, 143 Condenser lens
134, 144, 234, 244 Light receiving unit
134a, 134b, 134c, 134d, 144a, 144b, 144c, 144d, 234a, 234b, 234c,
234d, 234e, 234f, 244a, 244b, 244c, 244d, 244e, 244f Light receiving element
135, 145 Light receiving unit substrate
136, 146 Transparent member
140, 240 Lower unit
145a, 245a AFE
145b, 245b Pixel output conversion
145c, 245c LVDS output
150 Transport path
160, 260 Memory
161 B-side visible reflection raw image data
162, 262 B-side reflection image data
163, 263 B-side UV fluorescence image data
164, 264 A-side visible reflection raw image data
165, 265 A-side reflection image data
166, 266 A-side UV fluorescence image data
167, 267 Transmission image data
170, 270 Control unit
171, 271 Image data generating unit
171a, 271a LVDS input
171b, 271b Wavelength separation
171c, 271c Dark output cut
171d, 271d Gain adjustment
171e, 271e Light output correction
172, 272 Line memory
173, 273 Light-source control unit
174, 274 AFE control unit

The invention claimed is:

1. A light receiving sensor comprising:
a filter that includes
a plurality of visible-light bandpass filter regions each of which allows visible light of a plurality of different wavelength bands to pass therethrough while blocking visible light of other wavelength bands and infrared light;
a first infrared-light bandpass filter region that allows infrared light of a first infrared wavelength band to pass therethrough while blocking infrared light of other wavelength bands and visible light,
a second infrared-light bandpass filter region that allows infrared light of a second infrared wavelength band, which is different from the first infrared wavelength band or a part of which overlaps with the first infrared wavelength band, to pass therethrough while blocking infrared light of other wavelength bands and visible light and
a third infrared-light bandpass filter region that allows infrared light of a third infrared wavelength band, which is different from the first infrared wavelength band and the second infrared wavelength band or a part of which overlaps with the first infrared wavelength band and/or the second infrared wavelength band, to pass therethrough while blocking infrared light of other wavelength bands and visible light and
a light receiving unit that includes
a plurality of light receiving elements each of which detects each of the visible light of the plurality of different wavelength bands that passes through each visible-light bandpass filter regions, and each of the infrared light of the plurality of wavelength bands that passes through each infrared-light bandpass filter region.

2. The light receiving sensor as claimed in claim 1, wherein
the filter includes at least
a first visible-light bandpass filter region that allows visible light of a first wavelength band to pass therethrough while blocking visible light of other wavelength bands and infrared light;

a second visible-light bandpass filter region that allows visible light of a second wavelength band, which is different from the first wavelength band or a part of which overlaps with the first wavelength band, to pass therethrough while blocking visible light of other wavelength bands and infrared light; and a third visible-light bandpass filter region that allows visible light of a third wavelength band, which is different from the first wavelength band and the second wavelength band or a part of which overlaps with the first wavelength band and/or the second wavelength band, to pass therethrough while blocking visible light of other wavelength bands and infrared light.

3. The light receiving sensor as claimed in claim 2, wherein:

the light receiving unit includes:
- a first light receiving element that detects the visible light that passes through the first visible-light bandpass filter region;
- a second light receiving element that detects the visible light that passes through the second visible-light bandpass filter region;
- a third light receiving element that detects the visible light that passes through the third visible-light bandpass filter region; and
- a fourth light receiving element that detects the infrared light that passes through the first infrared-light bandpass filter region;
- a fifth light receiving element that detects the infrared light that passes through the second infrared-light bandpass filter region; and
- a sixth light receiving element that detects the infrared light that passes through the third infrared-light bandpass filter region.

4. A sensor module comprising:

a light receiving sensor as claimed in claim 1 that includes the filter and the light receiving unit;

a light emitting unit that emits the visible light and the infrared light on an object; and an outputting unit that outputs data detected in the light receiving unit.

5. The sensor module as claimed in claim 4, wherein the filter further includes
- a first visible-light bandpass filter region that allows visible light of a first wavelength band to pass therethrough while blocking visible light of other wavelength bands and infrared light;
- a second visible-light bandpass filter region that allows visible light of a second wavelength band, which is different from the first wavelength band or a part of which overlaps with the first wavelength band, to pass therethrough while blocking visible light of other wavelength bands and infrared light; and
- a third visible-light bandpass filter region that allows visible light of a third wavelength band, which is different from the first wavelength band and the second wavelength band or a part of which overlaps with the first wavelength band and/or the second wavelength band, to pass therethrough while blocking visible light of other wavelength bands and infrared light, the light receiving element includes
- a first light receiving element that detects the visible light that passes through the first visible-light bandpass filter region;
- a second light receiving element that detects the visible light that passes through the second visible-light bandpass filter region;
- a third light receiving element that detects the visible light that passes through the third visible-light bandpass filter region; and
- a fourth light receiving element that detects the infrared light that passes through the first infrared-light bandpass filter region;
- a fifth light receiving element that detects the infrared light that passes through the second infrared-light bandpass filter region; and
- a sixth light receiving element that detects the infrared light that passes through the third infrared-light bandpass filter region, and the outputting unit outputs the first light receiving data detected in the first light receiving element, the second light receiving data detected in the second light receiving element, the third light receiving data detected in the third light receiving element, fourth light receiving data detected in the fourth light receiving element, fifth light receiving data detected in the fifth light receiving element, and sixth light receiving data detected in the sixth light receiving element.

6. The sensor module as claimed in claim 5, wherein the outputting unit outputs, in parallel, the first light receiving data, the second light receiving data, the third light receiving data, and the fourth light receiving data as signals of a low voltage differential signaling method.

7. The sensor module as claimed in claim 5, wherein the outputting unit outputs, in parallel, the first light receiving data, the second light receiving data, the third light receiving data, the fourth light receiving data, the fifth light receiving data, and the sixth light receiving data as signals of a low voltage differential signaling method.

8. The sensor module as claimed in claim 5, wherein
the light emitting unit includes
- a visible-light emitting element that emits white light including the first wavelength band, the second wavelength band, and the third wavelength band;
- a first infrared-light emitting element that emits infrared light of the first infrared wavelength band;
- a second infrared-light emitting element that emits infrared light of the second infrared wavelength band different from the fourth first infrared wavelength band;
- a third infrared-light emitting element that emits infrared light of the third infrared wavelength band different from the first infrared wavelength band and the second infrared wavelength band; and
- a control unit that provides a control to cause
  the first infrared-light emitting element to emit light at a first light emitting timing,
  the second infrared-light emitting element to emit light at a second light emitting timing different from the first light emitting timing, and
  the third infrared-light emitting element to emit light at a third light emitting timing different from the first light emitting timing and the second light emitting timing.

9. The sensor module as claimed in claim 8, wherein,
the outputting unit outputs, in parallel:
the first light receiving data, the second light receiving data, the third light receiving data, and the fourth light receiving data as a signal of a low voltage differential signaling method in response to the first light emitting timing;

the first light receiving data, the second light receiving data, the third light receiving data, and the fourth light receiving data as a signal of a low voltage differential signaling method in response to the second light emitting timing; and the first light receiving data, the second light receiving data, the third light receiving data, and the fourth light receiving data as a signal of a low voltage differential signaling method in response to the third light emitting timing.

10. The sensor module as claimed in claim 8, wherein the light emitting unit includes
an ultraviolet-light emitting element that emits light including ultraviolet light; and
an ultraviolet-light transmission filter that blocks at least one of visible light and infrared light among the light emitted by the ultraviolet-light emitting element, and
the control unit provides a control to cause the ultraviolet-light emitting element to emit light at a fourth light emitting timing that is different from each of the first light emitting timing, the second light emitting timing, and the third light emitting timing.

11. The sensor module as claimed in claim 8, wherein the light emitting unit further includes a light guide which guides the white light, the infrared light of the first infrared wavelength band, the infrared light of the second infrared wavelength band, and the infrared light of the third infrared wavelength band, which are input from one or a plurality of input ends, to a predetermined output end.

12. The sensor module as claimed in claim 5, wherein the light emitting unit includes
a visible-light emitting element that emits white light including the first wavelength band, the second wavelength band, and the third wavelength band;
an infrared-light emitting element that emits infrared light; and
a control unit that controls a light emitting timing of the visible-light emitting element and the infrared-light emitting element so that the light emitting timings have an overlap.

13. The sensor module as claimed in claim 12, wherein the visible-light emitting element includes
a first visible-light emitting element that emits the visible light of the first wavelength band;
a second visible-light emitting element that emits the visible light of the second wavelength band; and
a third visible-light emitting element that emits the visible light of the third wavelength band, and
the control unit controls the first visible-light emitting element, the second visible-light emitting element, the third visible-light emitting element, and the infrared-light emitting element so that light emitting timings thereof have an overlap.

14. The sensor module as claimed in claim 12, wherein the infrared-light emitting element includes
a first infrared-light emitting element that emits the infrared light of the first infrared wavelength band;
a second infrared-light emitting element that emits the infrared light of the second infrared wavelength band different from the first infrared wavelength band; and
a third infrared-light emitting element that emits the infrared light of the third infrared wavelength band different from the first infrared wavelength band and the second infrared wavelength band.

15. The sensor module as claimed in claim 12, wherein the light emitting unit includes an ultraviolet-light emitting element that emits light including an ultraviolet light; and
an ultraviolet-light transmission filter that blocks at least one of the visible light and the infrared light among the lights emitted by the ultraviolet-light emitting element, and
the control unit controls
the visible-light emitting element and the infrared-light emitting element to emit light at the first light emitting timing so as to have an overlap, and
the ultraviolet-light emitting element to emit the light at the second light emitting timing different from the first light emitting timing.

16. The sensor module as claimed in claim 12, wherein the light emitting unit further includes a light guide which guides the white light, the infrared light of the first infrared wavelength band, the infrared light of the second infrared wavelength band, and the infrared light of the third infrared wavelength band, which are input from one or a plurality of input ends, to a predetermined output end.

17. A paper sheet handling apparatus including a sensor module that detects visible light and infrared light that pass through a paper sheet being transported or detects visible light and infrared light reflected from the paper sheet, and an image formation processing unit that forms an image relating to the paper sheet based on the visible light and the infrared light detected by the sensor module, wherein
the sensor module includes
a light emitting unit that emits light including at least the visible light and the infrared light; and
a filter that receives reflected light from the paper sheet and transmissive light passed through the paper sheet while the light emitting unit emits light to the paper sheet being transported, and has
a plurality of filter regions each of which allows visible light of a plurality of different wavelength bands to pass therethrough while blocking visible light of other wavelength bands and infrared light; and
one or a plurality of filter regions each of which allows infrared light of one or a plurality of wavelength bands to pass therethrough while blocking visible light;
a light receiving unit having a plurality of light receiving elements each of which detects visible light of the plurality of the different wavelength bands that pass through each of the filter regions, and detects infrared light of the one or the plurality of the different wavelength bands; and
an outputting unit that outputs each light receiving data detected by the light receiving elements to the image formation processing unit
wherein
the light emitting unit provides a control to emit the visible light and the infrared light in a first light emitting timing so as to have an overlap, and irradiates an excitation light of a wavelength band different from the wavelength band of the visible light and the infrared light at a second light emitting timing different from the first light emitting timing, and
the light receiving unit detects in the light receiving elements light emitted from the paper sheet in response to the irradiation of the excitation light by the light emitting unit.

18. The paper sheet handling apparatus as claimed in claim 17, wherein the image formation processing unit receives in parallel each of the light receiving data detected by the light receiving elements, and based on the received light receiving data forms a visible light image and an infrared light image for each of the different wavelength bands.

19. The paper sheet handling apparatus as claimed in claim 17, wherein, in the light receiving unit, the light receiving elements are arranged linearly in a main-scanning direction or a sub-scanning direction of the paper sheet, or are arranged in an array in the main-scanning direction and the sub-scanning direction.

20. A sensor module comprising:
a light emitting unit that emits visible light and infrared light of a plurality of different wavelength bands to a sheet;
a filter that includes
a visible-light bandpass filter region that passes visible light of a predetermined wavelength band, and
an infrared-light bandpass filter region that passes infrared light of a predetermined wavelength band; and
a light receiving unit that detects light from the sheet via the filter;
wherein
during a first time period, the light emitting unit simultaneously emits the at least one visible light and an infrared light of a first wavelength band, and
during a second time period different from the first time period, the light emitting unit simultaneously emits the at least one visible light and an infrared light of a second wavelength band different from the first wavelength band.

21. The sensor module as claimed in claim 20, wherein the light receiving unit detects light from entire surface of the sheet being transported while the light emitting unit repeats a cycle of emission, the cycle including the first time period and the second time period.

22. The sensor module as claimed in claim 20, wherein visible light emitted by the light emitting unit during the first time period and the second time period includes red light, green light and blue light.

23. The sensor module as claimed in claim 20, wherein visible light emitted by the light emitting unit during the first time period and the second time period is white light.

* * * * *